(12) United States Patent
Sugiura et al.

(10) Patent No.: US 6,327,849 B1
(45) Date of Patent: Dec. 11, 2001

(54) EXHAUST GAS PURIFYING APPARATUS FOR INTERNAL COMBUSTION ENGINE AND CONTROLLER FOR INTERNAL COMBUSTION ENGINE

(75) Inventors: Kenji Sugiura; Hiroshi Ohno; Masahiro Sakanushi; Keiichi Yagisawa, all of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/559,733

(22) Filed: Apr. 28, 2000

(30) Foreign Application Priority Data

Jun. 8, 1999 (JP) ................................. 11-161005
Jun. 14, 1999 (JP) ................................. 11-167432

(51) Int. Cl.$^7$ ....................................... F01N 3/00
(52) U.S. Cl. ............................. 60/277; 60/274; 60/285; 60/297
(58) Field of Search ..................... 60/276, 277, 297, 60/301, 285, 295, 274

(56) References Cited

U.S. PATENT DOCUMENTS

| 5,473,887 | * | 12/1995 | Takeshima et al. | 60/276 |
| 5,483,795 | * | 1/1996 | Katoh et al. | 60/276 |
| 5,735,119 | * | 4/1998 | Asanuma et al. | 60/276 |
| 5,743,084 | * | 4/1998 | Hepburn | 60/274 |
| 5,771,685 | * | 6/1998 | Hepburn et al. | 60/274 |
| 5,974,788 | * | 11/1999 | Hepburn et al. | 60/274 |
| 6,041,592 | * | 3/2000 | Huynh et al. | 60/274 |
| 6,134,882 | * | 10/2000 | Huynh et al. | 60/274 |

\* cited by examiner

Primary Examiner—Thomas Denion
Assistant Examiner—Binh Tran
(74) Attorney, Agent, or Firm—Sughrue, Mion, Zinn, Macpeak & Seas, PLLC

(57) ABSTRACT

When deterioration of a NOx purifying device due to sulfur contamination is detected, a specific operating state flag FHL is set to "1," and, at intervals equal to or shorter than, for example, three seconds, the air-fuel ratio of an air-fuel mixture to be supplied to an engine is varied so that it is alternately leaner and richer than the stoichiometric air-fuel ratio. When the temperature TCAT of the NOx purifying device exceeds a deterioration recovery temperature STCAT2 while the air-fuel ratio variation control is being executed, the SOx removing flag FHLSOx is set to "1," and for a period equivalent to the deterioration recovery time TRSOx, the air-fuel ratio is maintained richer than the stoichiometric air-fuel ratio.

30 Claims, 25 Drawing Sheets

|  |  | TLEAN(sec) | | | | |
|---|---|---|---|---|---|---|
|  |  | 0.1 | 0.2 | 0.3 | 0.4 | 0.5 |
| TRICH (sec) | 0.1 | C | C | D | D | D |
|  | 0.2 | C | C | D | D | D |
|  | 0.3 | D | D | A | D | D |
|  | 0.4 | D | D | D | B | D |
|  | 0.5 | D | D | D | D | B |

|  |  | AFL | | | | | |
|---|---|---|---|---|---|---|---|
|  |  | 20 | 19.5 | 19 | 18.5 | 18 | 17.5 |
| AFR | STOICH | F |  |  |  |  |  |
|  | 13.5 | F |  |  |  |  |  |
|  | 12 | F |  |  |  |  |  |
|  | 11 | E | F | F | H | H | H |
|  | 10 | G |  |  |  |  |  |
|  | 9 | G |  |  |  |  |  |

EXHAUST GAS PURIFYING APPARATUS FOR INTERNAL COMBUSTION ENGINE AND CONTROLLER FOR INTERNAL COMBUSTION ENGINE

BACKGROUND OF THE INVENTION

1. Field of the Invention

The present invention relates to an exhaust gas purifying apparatus for an internal combustion engine, and a controller for an internal combustion engine wherein nitrogen oxide (NOx) is absorbed by a purifying device provided for an exhaust system.

2. Description of the Related Art

When the air-fuel ratio of the air-fuel mixture supplied to an internal combustion engine is set leaner than the stoichiometric air-fuel ratio and the lean operation is executed, the volume of NOx that is discharged with the exhaust gases tends to increase. Therefore, in a well known conventional technique, a NOx absorbent for absorbing NOx during a lean operation is provided for the exhaust system of an internal combustion engine, and as needed, the absorbed NOx is purified by reduction (e.g., Japanese Patent No. 2,586,739).

The NOx absorbent of the NOx purifying device has the following characteristics: when the air-fuel ratio is set so that a leaner mixture is supplied than one that is theoretically correct, and the oxygen content of the exhaust gases is comparatively high (the exhaust contains a high percentage of NOx; a condition hereinafter referred to as a lean exhaust-gas condition), NOx is absorbed, while when the air-fuel ratio is set so that a richer mixture is supplied than the theoretically correct one and the oxygen content of the exhaust gases is comparatively low (a condition hereinafter referred to as a rich exhaust-gas condition), NOx is discharged. The NOx purifying device is so designed that, during a rich exhaust-gas condition, the NOx released by the NOx absorbent is reduced by HC and CO and is discharged as nitrogen gas, while the HC and CO are oxidized and are discharged as steam and carbon dioxide.

Since the NOx absorbent of the NOx purifying device absorbs not only NOx but also SOx (sulfur oxide), in the absorbent there is a gradual buildup of the sulfur (S) that is contained in fuel. As a result, a problem has arisen because sulfur contamination can drastically reduce the available capacity for the absorption of NOx (for example, an absorption capacity of 80% can be reduced to approximately 20%). But since the SOx absorbed by the NOx absorbent can be discharged therefrom when the NOx absorbent is maintained at a high temperature (600° C. or higher), the volume of the SOx contamination can be reduced by setting a rich air-fuel ratio. However, only when a high-load operation is continuously performed for a comparatively extended period of time can the temperature of the NOx absorbent be elevated so it is equal to or higher than 600° C. Therefore, the operating state wherein an air-fuel ratio rich operation can be performed to remove SOx is actually limited, and SOx can not be satisfactorily purified.

Further, to discharge and reduce the SOx, it is preferable that the temperature of the NOx absorbent be elevated rapidly, within a short period of time. It has confirmed that when the air-fuel ratio of an air-fuel mixture to be supplied to an engine is altered so that it is first leaner and then richer than the stoichiometric air-fuel ratio, and when a short time interval, 3 seconds or less, for example, is allocated for this variation, the temperature of the NOx absorbent can be elevated rapidly, within a short period of time. However, while only a short interval is required for the air-fuel ratio variation, within this short interval a change in the output torque of the engine is also experienced, and is accompanied by the deterioration of the engine's operating performance.

SUMMARY OF THE INVENTION

It is an object of the present invention to provide an exhaust gas-purifying apparatus that can, in a short period of time, elevate the temperature of a NOx absorbent to a temperature that is adequate for the discharge of SOx, and that can efficiently remove SOx that has been absorbed by the NOx absorbent.

It is another object of the present invention to provide a controller for an internal combustion engine that can rapidly elevate the temperature of a NOx absorbent and remove SOx quickly, without adversely affecting the operating performance of the engine.

To achieve the above object, according to a first aspect of the invention, an exhaust gas purifying apparatus for the exhaust system of an internal combustion engine, comprises:

nitrogen oxide purifying means for absorbing the nitrogen oxide in exhaust gases in a lean exhaust-gas condition during which the oxygen concentration of the exhaust gas is comparatively high;

deterioration detection means for detecting the deterioration of the nitrogen oxide purifying means;

air-fuel ratio variation means for, when the deterioration of the nitrogen oxide purifying means is detected by the deterioration detection means, varying, during an interval that is set equal to or shorter than a predetermined time, the air-fuel ratio for the air-fuel mixture supplied to the internal combustion engine, and to thus provide an air-fuel ratio that is leaner or richer than a stoichiometric air-fuel ratio; and deterioration recovery means for, when an elevated temperature attained at the nitrogen oxide purifying means exceeds a deterioration recovery temperature following activation of the air-fuel ratio variation means, performing deterioration recovery by maintaining for an adequate period of time a richer air-fuel ratio than the stoichiometric air-fuel ratio.

The "predetermined time" is an appropriate time period for effecting the elevation of the temperature of the nitrogen oxide purifying means, e.g., three seconds or less. Specifically, when fuel consumption during the air-fuel ratio variation control process is an important factor, it is preferable that the predetermined time be (lean time+rich time), wherein the "lean time," for setting the air-fuel ratio richer than the stoichiometric air-fuel ratio, is defined as a period of 2 seconds or less, and the "rich time," for controlling the air-fuel ratio that is richer than the stoichiometric air-fuel ratio, is defined as ½ the lean time or shorter. When rapid elevation of the temperature of the nitrogen oxide purifying means during the air-fuel ratio variation control processing is more important, and especially when a three-way catalyst is positioned immediately downstream of the engine and the nitrogen oxide purifying means is positioned downstream of the three-way catalyst and slightly separated from the engine, it is preferable that substantially the same period be set for the lean time and the rich time.

The "deterioration recovery temperature" is defined as substantially the lowest temperature whereat SOx begins to be discharged from the nitrogen oxide absorbent in the nitrogen oxide purifying means, or is defined as a temperature 50 to 100° C. higher than the lowest temperature, while taking into account the fact that the temperature will be reduced when the air-fuel rich operation is initiated by the deterioration recovery means. Furthermore, in accordance with the degree of deterioration detected by the deterioration detection means, i.e., in accordance with the volume of the SOx accumulated in the nitrogen oxide purifying means at the time the deterioration was detected, the period set for the "deterioration recovery time" is, for example, the time required for the reduction of substantially all the adsorbed SOx.

It is preferable that temperature detection means be provided to actually detect the temperature of the nitrogen oxide purifying means, and that the detected value be employed to determine whether the temperature of the nitrogen oxide purifying means is greater than the deterioration recovery temperature. However, instead of using the temperature detection means, whether the air-fuel ratio variation time of the air-fuel ratio variation means exceeds the predetermined temperature elevation time may be determined to ascertain whether the temperature of the nitrogen oxide purifying means is higher than the deterioration recovery temperature. In this case, an experiment was conducted for a plurality of apparatuses, and the "predetermined temperature elevation time" was set in accordance with the actual time required for the deterioration recovery time to be reached.

With this arrangement, when deterioration of the nitrogen oxide purifying means is detected by the deterioration detection means, the air-fuel ratio of the gas mixture to be supplied to the engine is changed, at an interval set equal to or shorter than the predetermined time, so that it is richer or leaner than the stoichiometric air-fuel ratio. And when, during the air-fuel ratio variation control processing, the temperature of the nitrogen oxide purifying means is elevated until it exceeds the deterioration recovery temperature, for the time period allocated for the deterioration recovery the air-fuel ratio is maintained richer than the stoichiometric air-fuel ratio. Therefore, the temperature of the nitrogen oxide purifying means can be quickly elevated to the deterioration recovery temperature required for SOx removing, and the SOx that has been absorbed by the nitrogen oxide purifying means can be purified efficiently. As a result, a preferable exhaust gas characteristic can be maintained for an extended period of time.

According to a second aspect of the invention, an exhaust gas purifying apparatus for the exhaust system of an internal combustion engine, comprises:

nitrogen oxide purifying means for absorbing nitrogen oxide contained in exhaust gases in a lean exhaust-gas condition in which the oxygen concentration of the exhaust gases is comparatively high;

deterioration detection means for determining whether deterioration of the nitrogen oxide purifying means has occurred;

air-fuel ratio variation means, in a specific operating state during which the exhaust gas airflow rate for the internal combustion engine is high, for varying the air-fuel ratio of an air-fuel mixture supplied to the internal combustion engine that is alternately leaner and richer than the stoichiometric air-fuel ratio, at a set time interval which is equal to or shorter than a predetermined time; and deterioration recovery means, for, when the temperature of the nitrogen oxide purifying means exceeds a deterioration recovery temperature, maintaining an air-fuel ratio that is richer than the stoichiometric air-fuel ratio for a period of time in accordance with the deterioration recovery processing required for the degree of deterioration detected.

The "specific operating state" is the operating state during which the rotational speed of the engine exceeds a predetermined rotational speed, and during which the absolute air-intake pipe internal pressure is greater than a predetermined pressure. Further, the specific operating state may include a condition during which the temperature of the nitrogen oxide purifying means is higher than a predetermined temperature that is lower than the deterioration recovery temperature, and may also include a condition during which the speed of a vehicle in which the engine is installed is higher than a predetermined speed. In this case, since the predetermined rotational speed, the predetermined pressure, the predetermined temperature and the predetermined speed are varied depending on the characteristics of an employed nitrogen oxide purifying means and the specifications for the engine, appropriate values are determined and set through experiment.

In addition, the "predetermined time" and the "deterioration recovery temperature" are the same as those for the exhaust gas purifying device of the first aspect, and the "deterioration recovery time" is set to a value as large as is required for the degree of deterioration detected by the deterioration detection means, i.e., a setting that is appropriate when a large volume of SOx has accumulated in the nitrogen oxide purifying means.

With this arrangement, in a specific operating state wherein the engine exhaust gas airflow rate is large, the air-fuel ratio of the gas mixture to be supplied to the engine is varied at set intervals, which are equal to or shorter than the predetermined time, by the alternate supply of an air-fuel ratio that is richer and one that is leaner than the stoichiometric air-fuel ratio. And when the temperature of the nitrogen oxide purifying means is elevated and exceeds the deterioration recovery temperature, an air-fuel ratio that is richer than the stoichiometric air-fuel ratio is maintained for a deterioration recovery time period that is consonant with the degree of deterioration detected. Therefore, while a high nitrogen oxide purifying rate can be obtained in the specific operating state, the temperature of the nitrogen oxide purifying means can be quickly elevated to the deterioration recovery temperature for SOx removing, and the SOx that has been absorbed by the nitrogen oxide purifying means can be efficiently purified. As a result, a preferable exhaust gas characteristic can be maintained for an extended period of time.

To achieve the above object, according to a third aspect of the present invention, a controller for an internal combustion engine, provided for the exhaust system of an internal combustion engine, comprises:

nitrogen oxide purifying means for absorbing nitrogen oxide contained in exhaust gases in a lean exhaust-gas condition in which an oxygen concentration in an exhaust gas is comparatively high;

exhaust reflux means for returning exhaust gases to an intake system;

air-fuel ratio variation means for varying the air-fuel ratio of an air-fuel mixture supplied to the internal combustion engine that is alternately leaner and richer than the stoichiometric air-fuel ratio, at a set time interval which is equal to or shorter than a predetermined time;

exhaust reflux control means for, during the operation of the air-fuel ratio variation means, reducing the volume of the exhaust gases that are returned by the exhaust ref lux means; and ignition timing control means for delaying the ignition timing when the air-fuel ratio that is set by the air-fuel ratio variation means is richer, and for advancing the ignition timing when the air-fuel ratio that is set by the air-fuel ratio variation means is leaner.

The "predetermined time" is set equal to a period of time that is appropriate for elevating the temperature of the nitrogen oxide purifying means, e.g., three seconds or shorter.

With this arrangement, when the air-fuel ratio is to be varied in a short interval, the exhaust reflux volume is reduced. In addition, when the air-fuel ratio is set richer than the stoichiometric air-fuel ratio, the ignition timing is delayed, and when the air-fuel ratio is set leaner than the stoichiometric air-fuel ratio, the ignition timing is advanced. Therefore, even when the air-fuel ratio is changed by delaying or advancing the ignition timing, variations in the engine output torque can be suppressed, and adverse affects, such as a delay in the response by the exhaust reflux means that is caused by a reduction in the exhaust reflux volume, can be minimized, and a preferable operation can be maintained.

PREFERRED EMBODIMENTS OF THE INVENTION

Figure 1:
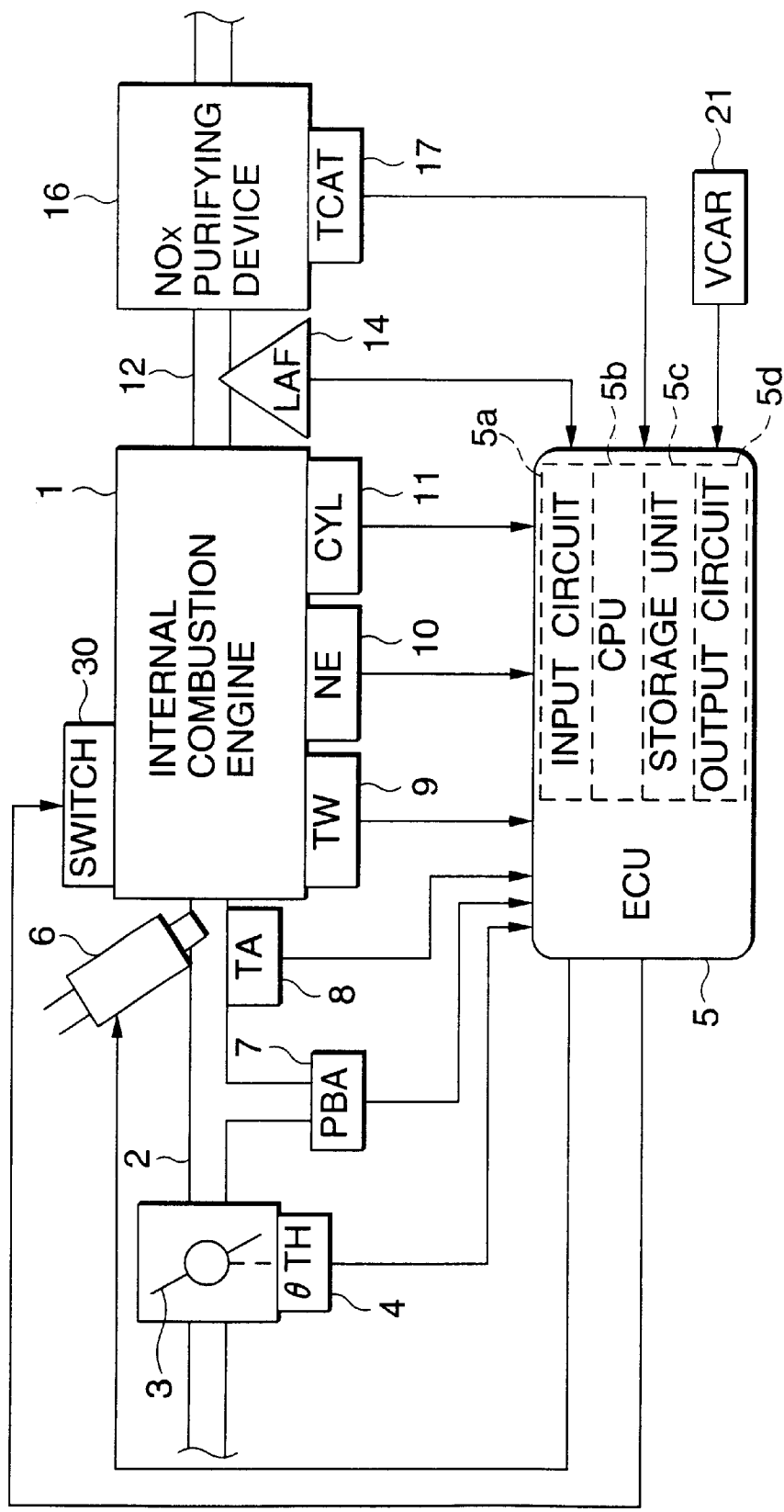
FIG. 1 is a diagram showing the arrangement of an internal combustion engine and its controller according to a first embodiment of the invention.

The preferred embodiments of the present invention will now be explained while referring to the drawings.

First Embodiment

FIG. 1 is a diagram showing the overall arrangement of an internal combustion engine (hereinafter referred to as an "engine") including an exhaust gas purifying apparatus according to a first embodiment of the present invention and a controller therefor. A throttle valve 3 is located along the route of an air intake pipe 2 of a four-cylinder engine 1. The throttle valve 3 is connected to a throttle valve travel (θTH) sensor 4, and an electric signal that represents the travel of the throttle valve 3 is output by the sensor 4 to an engine control electronic control unit (hereinafter referred to as an "ECU") 5.

A fuel injection valve 6 is provided, for each cylinder, between the engine 1 and the throttle valve 3 and a little upstream of the air intake valve (not shown) of the air intake pipe 2. Each fuel injection valve 6 is connected to a fuel pump (not shown), and is electrically connected to the ECU 5, so that the time required to open the fuel injection valve 6 is controlled in accordance with a signal from the ECU 5.

An absolute air-intake-pipe internal pressure (PBA) sensor 7 is positioned immediately downstream of the throttle valve 3. An absolute pressure signal is converted by the absolute pressure sensor 7 into an electric signal, which is transmitted to the ECU 5. An intake air temperature (TA) sensor 8, which is located downstream of the sensor 7, detects an intake air temperature TA, and outputs a corresponding electric signal to the ECU 5.

An engine water temperature (TW) sensor 9, which is mounted on the main body of the engine 1, is constituted by a thermister. The sensor 10 detects an engine water temperature (cooling water temperature) TW and outputs a corresponding electric signal to the ECU 5.

An engine revolution (NE) sensor 10 and a cylinder identification (CYL) sensor 11 are provided on the peripheries of the cam shaft and the crank shaft (not shown) of the engine 1. Concerning the top dead center point (TDC), when each cylinder of the engine 1 begins its intake stroke, the engine revolution sensor 10 outputs a TDC signal pulse at a crank angle (each crank angle of 180° for the four-cylinder engine) that is smaller than a predetermined crank angle. The cylinder identification sensor 11 outputs a cylinder identification signal pulse at a predetermined crank angle for a specific cylinder, and each signal pulse is transmitted to the ECU 5.

A NOx purifying device 16, which is a nitrogen oxide purifying means, is positioned along an exhaust pipe 12. The NOx purifying device 16 incorporates a NOx absorbent for absorbing NOx, and a catalyst for promoting oxidization and reduction. The NOx absorbent can be an occlusion type or an adsorption type. The first absorbent type absorbs the NOx in a lean exhaust-gas condition wherein the air-fuel ratio of the air mixture to be supplied to the engine 1 is set leaner than the stoichiometric air-fuel ratio and the oxygen concentration in the exhaust gas is comparatively high (much NOx is contained), while the absorbent discharges NOx that has been absorbed in a rich exhaust-gas condition, wherein the air-fuel ratio of the mixture to be supplied to the engine 1 is set so that it equals or exceeds the stoichiometric air-fuel ratio and the oxygen concentration in the exhaust gas is comparatively low. The second absorbent absorbs NOx in the lean exhaust-gas condition, and reduces NOx in the rich exhaust-gas condition. The NOx purifying device 16 is so designed that in a lean exhaust-gas condition the NOx absorbent absorbs NOx, and in a rich exhaust-gas condition the NOx absorbent releases NOx that is reduced by HC and CO and is discharged as a nitrogen gas, while concurrently the CO is oxidized and is discharged as steam and dioxide. Ballium oxide (BaO), for example, is used as a NOx absorbent of an occlusion type, while sodium (Na) and titanium (Ti), or strontium (Sr) and titanium (Ti), are employed as a NOx absorbent of an adsorption type. A noble metal, such as rhodium (Rh), palladium (Pd) or Platinum (Pt), is employed as a catalyst for the occlusion type or for the adsorption type.

The NOx purifying device 16 incorporates the NOx absorbent. As described later, the NOx purifying device 16 executes control of the short-interval air-fuel ratio variation process, in which the air-fuel ratio of the air-fuel mixture supplied to the engine 1 is varied within a comparatively short period, in a specific engine operation condition. Therefore, the NOx can be efficiently reduced, merely by using the catalyst, without the NOx being absorbed by the NOx absorbent.

When the absorption of NOx continues until the absorption capacity limit of the NOx absorbent, i.e., the maximum NOx absorption volume, is reached and no further NOx can be absorbed, as needed, a rich air-fuel ratio is set, i.e., a reduction, rich operation is performed, in order to discharge the NOx for reduction.

A catalyst temperature sensor 17 is provided for the NOx purifying device to detect a temperature (hereinafter referred to as a "catalyst temperature) TCAT, and to transmit the detection signal to the ECU 5. The catalyst temperature TCAT represents the temperature of the NOx absorbent and the catalyst.

A linear air-fuel ratio sensor (hereinafter referred to as an "LAF sensor") 14 is arranged upstream of the NOx purifying device 16. The LAF sensor 14 outputs to the ECU 5 an electric signal that is substantially proportional to the oxygen concentration (air-fuel ratio) of the exhaust gases.

Further, the ECU 5, which is mounted on the engine 1, is connected to a speed sensor 21, which serves as speed detection means for detecting the running speed (car speed) VCAR of a vehicle that is driven by the engine 1 and which transmits a detection signal to the ECU 5.

The engine 1 has a valve timing switch mechanism 30 that can alternately set the valve timings for the air intake valve and the air exhaust valve at two levels: a quick valve timing that is appropriate for a rapidly rotating region of the engine, and a slow valve timing that is appropriate for a slowly rotating region. The switching of the valve timing includes the switching of the distance lifted by the valves. Further, when the slow valve timing is selected, one of the two valves is halted in order to ensure stable combustion, even when the air-fuel ratio is lower than the stoichiometric air-fuel ratio.

The valve timing switch mechanism 30 employs hydraulic pressure to switch the valve timing. A solenoid-controlled valve and a hydraulic sensor for this switching are connected to the ECU 5. The detection signal emitted by the hydraulic sensor is transmitted to the ECU 5, which then controls the solenoid-controlled valve when switching to a valve timing that is consonant with the operating state of the engine 1.

The ECU 5 includes: an input circuit 5a, which has functions for shaping the waveform of a signal received from each sensor, for correcting and setting the voltage at a predetermined level, and for converting an analog signal value into a digital signal value; a central processing unit (hereinafter referred to as a "CPU") 5b; storage unit 5c, for storing various operating programs that are executed by the CPU 5b, a table and a map used for the programs, and the results that are obtained by the CPU 5b; and an output circuit 5d, for transmitting a drive signal to the fuel injection valve 6.

Based on the above described engine parameter signals, the CPU 5b determines the existence of various engine operating states, and in accordance with a determined engine operating state, employs equation (1) to calculate a fuel injection time TOUT for the fuel injection valve 6, which is opened in synchronization with the TDC signal pulse.

$$TOUT = TI \times KCMD \times KLAF \times K1 + K2, \ldots \quad (1)$$

In this equation, TI denotes the basic fuel injection time for the fuel injection valve 6, and is determined by searching the TI map that is set in accordance with engine revolutions NE and absolute air-intake-pipe internal pressure PBA. The TI map is so set that the air-fuel ratio of a mixture to be supplied to an engine is substantially equal to the stoichiometric air-fuel ratio in an operating state that corresponds to the engine revolutions NE and the absolute air-intake-pipe internal pressure PBA.

KCMD denotes a target air-fuel ratio coefficient, and is set in accordance with engine parameters, such as the engine revolutions NE, the absolute air-intake-pipe internal pressure PBA and the engine water temperature TW. Since the target air-fuel coefficient KCMD is proportional to the reciprocal of air-fuel ratio A/F, i.e., air-fuel ratio F/A, and has a value of 1.0 at the stoichiometric air-fuel ratio, the coefficient KCMD is also called a target equivalence ratio.

KLAF denotes an air-fuel ratio compensation coefficient that is calculated under PID control, so that the equivalence ratio KACT, which is obtained from a detection value provided by the LAF sensor 14, matches the target equivalence ratio KCMD.

K1 and K2 denote another compensation coefficient and a compensation variable that are obtained in accordance with various engine parameter signals, and that are determined to be preset values, so that various characteristics, such as the fuel characteristics and engine acceleration characteristics, that are consonant with the engine operating state are optimized.

Based on the above obtained fuel injection time TOUT, the CPU 5b transmits a drive signal, for opening the fuel injection valve 6, to the fuel injection valve 6 via the output circuit 5d.

Figure 2:
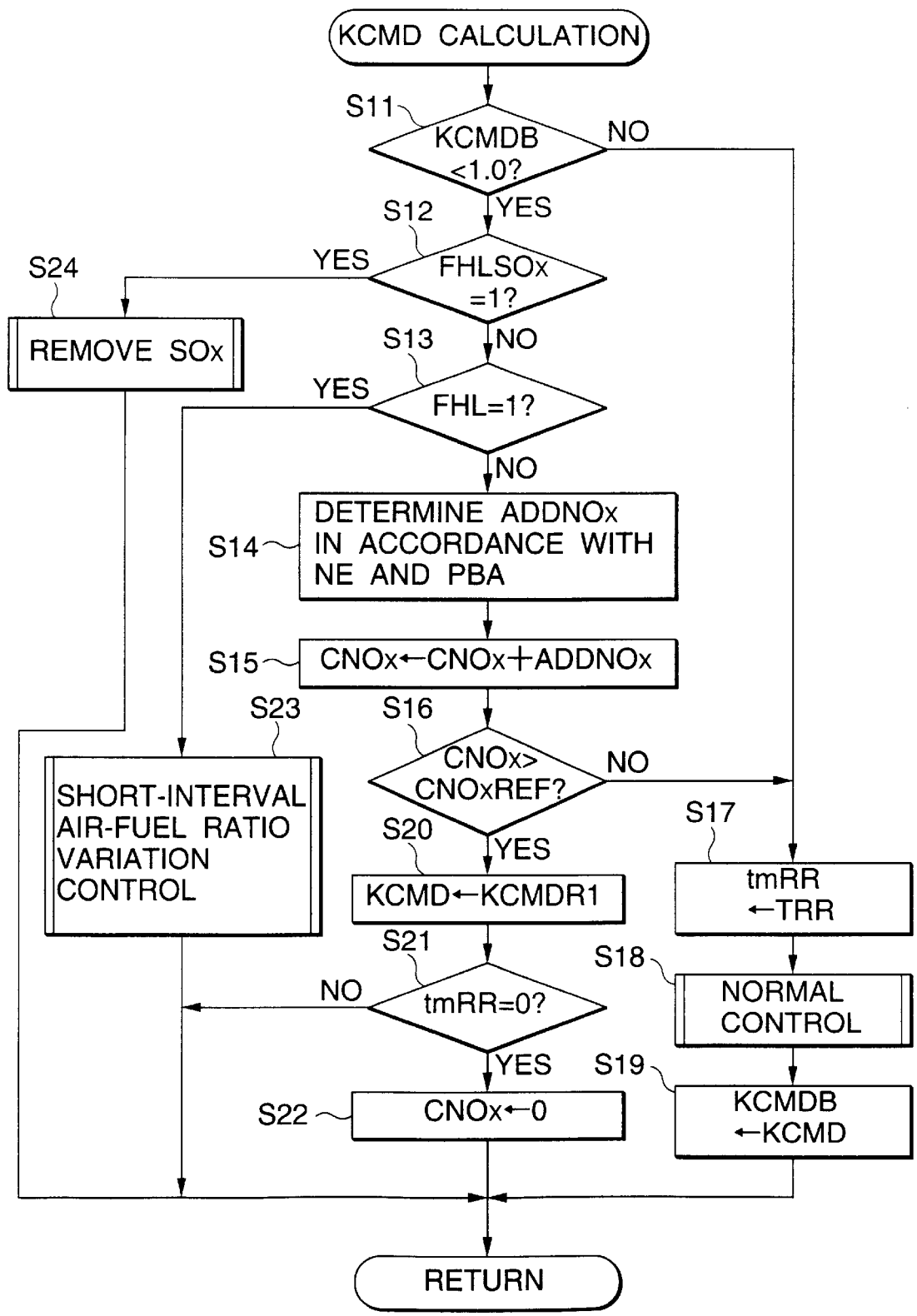
FIG. 2 is a flowchart showing the processing performed to set a target air-fuel ratio coefficient (KCMD)

FIG. 2 is a flowchart showing the processing performed to calculate the target air-fuel ratio coefficient KCMD used in equation (1). This processing is performed by the CPU 5b every constant time.

At step S11, a check is performed to determine whether a lean operation is being executed, i.e., whether the value KCMDB of the target air-fuel ratio coefficient KCMD, which is stored under normal control at step S19 and which will be described later, is smaller than 1.0. When KCMDB is equal to or greater than 1.0 and a lean operation is not currently being performed, program control goes to step S17, and the time TRR (e.g., one to two seconds) for the reduction, rich operation is set for a count-down timer tmRR, which will be referred to later at step S21, and the timer is started. Following this, the target air-fuel ratio coefficient KCMD is set under normal control, i.e., in accordance with the engine operating state (step S18). The target air-fuel ratio coefficient KCMD is basically calculated using the engine revolutions NE and the absolute air-intake-pipe internal pressure PBA, and is changed to a value in accordance with the operating state when the engine water temperature TW is low, or when a predetermined high load is imposed. The target air-fuel ratio coefficient KCMD obtained at step S18 is stored as the value KCMDB (step S19), and the processing is thereafter terminated.

When, at step S11, KCMDB<1.0 and a lean operation is being performed, a check is made to determine whether a SOx removing flag FHLSOx set by the processing performed in FIG. 3 equals "1," which indicates an engine operating state (hereinafter referred to as a "SOx removing operating state") wherein the exhaust gas airflow rate of the engine 1 is high and the catalyst temperature TCAT is high enough (600° C. or higher) to remove SOx (step S12). When FHLSOx=1 and the engine 1 is in the SOx removing operating state, a rich air-fuel ratio is set and the SOx removing processing (FIG. 7) is initiated (step S24).

When FHLSOx=0 at step S12, a check is performed to determine whether a specific operating state flag FHL set in the processing performed in FIG. 3 equals "1," which represents the engine operating state (hereinafter referred to as a "specific operating state") wherein the exhaust gas airflow rate of the engine 1 is high and the catalyst temperature TCAT is also high (step S13). When FHLS=1 and the engine 1 is in the specific operating state, the short-interval air-fuel ratio variation control processing is begun (step S23). On the other hand, when FHL=0 and the engine 1 is in an operating state other than the specific operating state, the processing at S14 and the following steps is performed by which, when compared with the short-interval air-fuel ratio variation control processing, the interval for the air-fuel ratio variation is extended. The SOx removing operating state corresponds to an operating state in which the catalyst temperature TCAT is especially high during a specific operation, and is one type of specific operating state.

At step S14, an increase value ADDNOx, which is used at step S15, is determined in accordance with the engine revolutions NE and the absolute air-intake-pipe internal pressure PBA. The increase value ADDNOx is a parameter that corresponds to the volume of the NOx that is output in the exhaust each unit hour during a lean operation. The value ADDNOx is increased in accordance with increases in the engine revolutions NE and the absolute air-intake-pipe internal pressure PBA.

At step S15, the increase value ADDNOx, which is determined at step S14, is employed to increment the NOx counter CNOx. As a result, a count value is obtained that corresponds to the volume of the NOx that is output in the exhaust, i.e., the volume of the NOx that is absorbed by the NOx absorbent.

CNOx=CNOx+ADDNOx

At step S16, a check is performed to determine whether the value of the NOx counter CNOx exceeds a permissible value CNOxREF. When the count value does not exceed the permissible value CNOxREF (NO), program control advances to step S17 and the target air-fuel ratio coefficient KCMD is set under normal control conditions, i.e., the engine operating state. The permissible value CNOxREF is set to a value corresponding to a NOx volume that is slightly smaller than the maximum NOx absorption capacity of the NOx absorbent, or with an allowance, is set to a value that corresponds to ½ the maximum NOx absorption capacity.

When, at step S16, the value of the counter CNOx exceeds the permissible value CNOxREF, the target air-fuel ratio coefficient KCMD is set to a predetermined rich value KCMDR1 that corresponds to an air-fuel ratio of 14.0, and a reduction, rich operation is executed (step S20). A check is then performed to determine whether the value of the timer tmRR is "0" (step S21). When the value of the timer tmRR is greater than "0," the processing is immediately terminated, but when tmRR equals "0," the value held by the NOx counter CNOx is reset (step S22). Thus, since from that time on the decision at step S16 will be negative (NO), control of the operation is shifted to normal.

In the processing in FIG. 2, a continuous lean operation time in the lean operation enabled state with FHL=0, other than the specific operating state, i.e., the time required for the value of the NOx counter CNOx to move from 0 to the permissible value CNOxREF, is varied in accordance with the engine operating state, but is about 8 to 30 seconds. Therefore, in the operating state other than the specific operating state, the air-fuel ratio variation control process is performed to set the continuous lean operation time to 3 to 30 seconds, and to set the reduction, rich operation time (=TRR) to 1 to 2 seconds.

Figure 3:
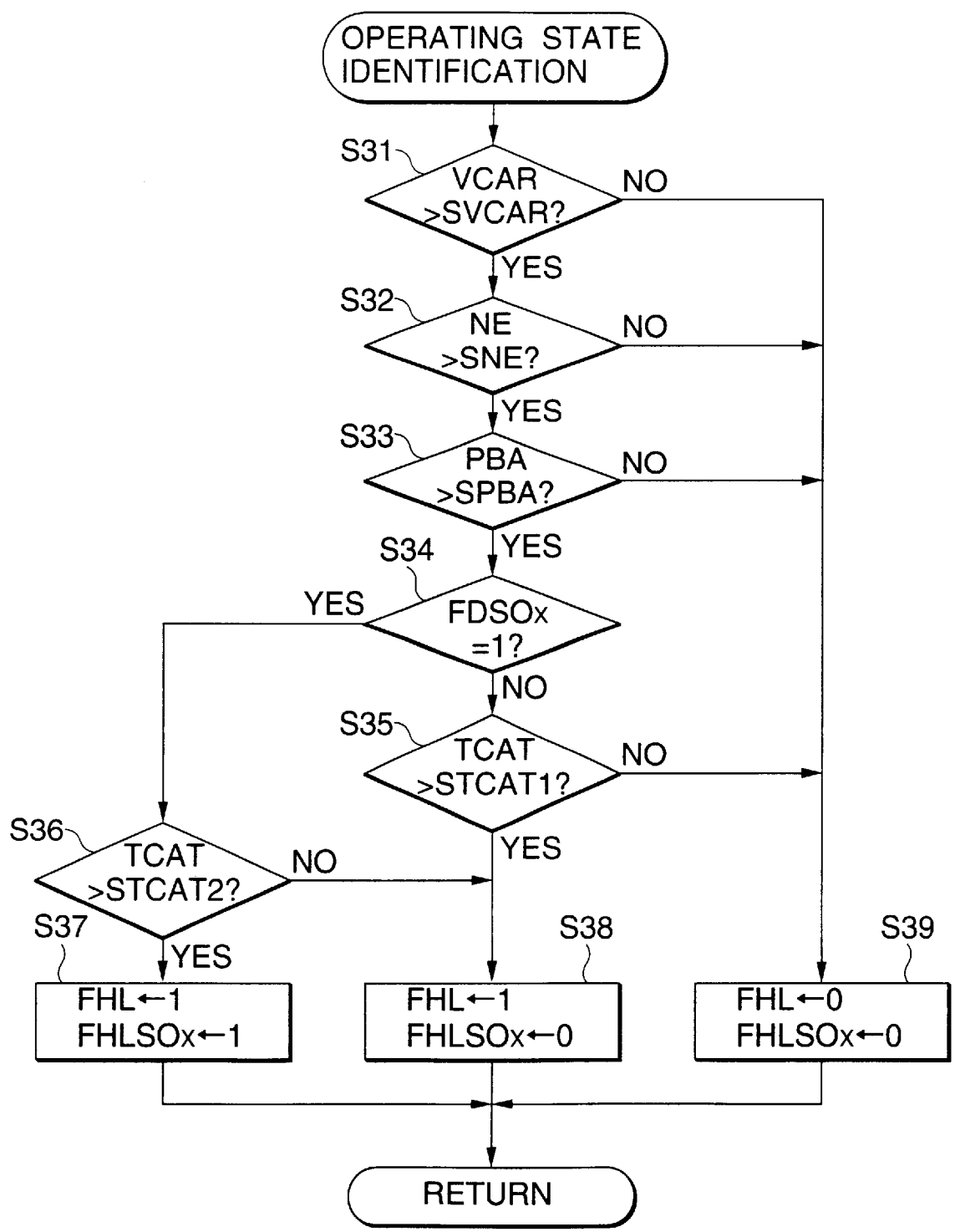
FIG. 3 is a flowchart showing the processing performed to identify a specific operating state and an operating state that is appropriate for SOx removing.

FIG. 3 is a flowchart showing the operating state identification processing for setting the SOx removing flag FHLSOx and the specific operating state flag FHL that are examined at steps S12 and S13 in FIG. 2. This processing is executed by the CPU 5b each constant time.

First, a check is performed to determine whether the speed VCAR is higher than a predetermined speed SVCAR (e.g., 60 km/h) (step S31). When VCAR>SVCAR, a check is performed to determine whether the engine revolutions NE are greater than predetermined revolutions SNE (e.g., 1800 rpm) (step S32). When NE>SNE, a check is performed to determine whether the absolute air-intake-pipe internal pressure PBA is higher than predetermined pressure SPBA (e.g., 360 mmHg) (step S33). When the decision at one of steps S31 to S33 is negative (NO), the specific operating state flag FHL and the SOx removing flag FHLSOx are set to "0" (step S39). The processing is thereafter terminated.

Figure 4:
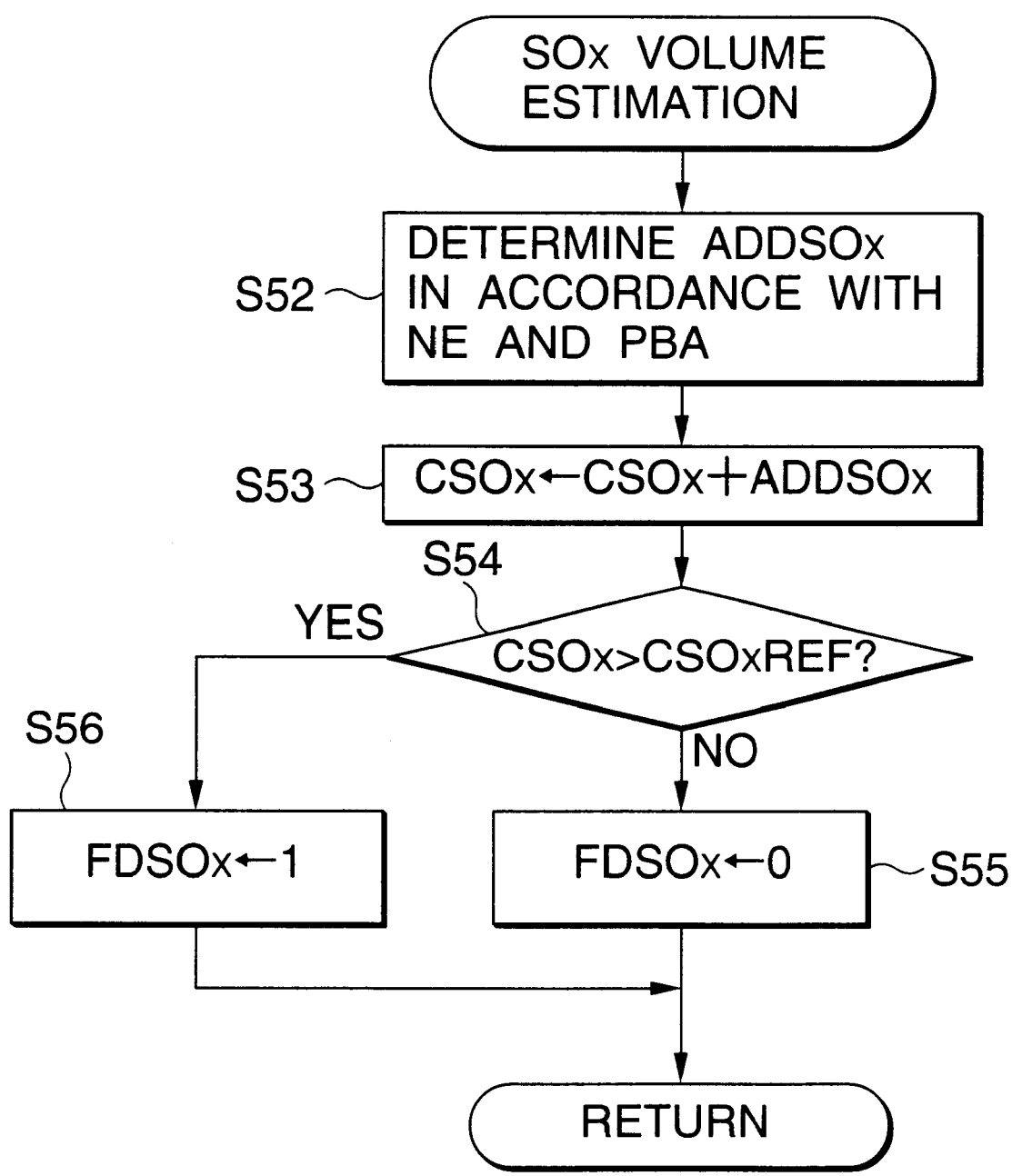
FIG. 4 is a flowchart showing the processing performed to estimate the volume of SOx that has been absorbed by a NOx absorbent.

When all the decisions at steps S31 to S33 are affirmative (YES), a check is performed to determine whether the deterioration flag FDSOx equals "1," which indicates that the volume of the SOx, which is estimated during the processing performed in FIG. 4 and which is absorbed by the NOx absorbent of the NOx purifying device 16, has exceeded a permissible value, i.e., whether deterioration of the NOx purifying device 16 has occurred (step S34). When FDSOx=0 and the SOx volume has not exceeded the permissible value, a check is performed to determine whether the catalyst temperature TCAT is higher than a predetermined temperature STCAT1 (e.g., 500° C.) (step S35). When TCAT>STCAT1, and the engine 1 is the specific operating state wherein the exhaust gas airflow rate is high and the catalyst temperature TCAT is also high, the specific operating flag FHL is set to "1" and the SOx removing flag FHLSOx is set to "0" (step S38), and the processing is thereafter terminated. When, however, TCAT≦STCAT1, program control advances to step S39.

When, at step S34, FDSOx=1 and deterioration of the NOx purifying device 16 has occurred, a check is performed to determine whether the catalyst temperature TCAT is higher than the deterioration recovery temperature STCAT2 (e.g., 600° C.), which is higher than the predetermined temperature STCAT1 (step S36). The deterioration recovery temperature STCAT2 is the temperature at which SOx begins to be discharged from the NOx absorbent, i.e., substantially the lowest temperature at which the NOx absorbent can discharge SOx. When at step S36 TCAT≦STCAT2, program control advances to step S38 to rapidly elevate the catalyst temperature TCAT. At step S38 the specific operating state flag FHL is set to "1," the short-interval air-fuel ratio variation control processing (step S23 in FIG. 2) is performed, and the elevation of the catalyst temperature TCAT is accelerated.

When at step S36 TCAT>STACT2, it is assumed that the operating state is the one for SOx removing, and both the specific operating state flag FHL and the SOx removing flag FHLSOx are set to "1" (step S37). The processing is thereafter terminated.

FIG. 4 is a flowchart showing the processing for estimating volume of the SOx that has been absorbed by the NOx absorbent of the NOx purifying device 16. This processing is performed by the CPU 5b every constant time.

First, an increase value ADDSOx, which is used at step S53, is determined in accordance with the engine revolutions NE and the absolute air-intake-pipe internal pressure PBA (step S52). The increase value ADDSOx is a parameter that corresponds to the volume of the SOx that is discharged each unit hour during a lean operation. The value ADDSOx is increased in accordance with increases in the engine revolutions NE and the absolute air-intake-pipe internal pressure PBA. Since the volume of the SOx that is discharged each unit hour is considerably smaller than the volume of the NOx in the exhaust, the increase value ADDSOx is smaller than the increase value ADDNOx, which corresponds to the volume of the NOx in the exhaust.

At step S53, the increase value ADDSOx, which is determined at step S52, is employed to increment the SOx counter CSOx. As a result, the count value that corresponds to the exhausted SOx volume, i.e., the volume of the SOx that is absorbed by the NOx absorbent, is obtained.

CSOx=CSOx+ADDSOx

Following this, at step S54, a check is performed to determine whether the value of the SOx counter SCOx exceeds a permissible CSOxREF. When CSOx≦CSOxREF, the deterioration flag FDSOx is set to "0" (step S55). When CSOx>CSOXREF, the deterioration flag FDSOX is set to "1" (step S56). The permissible CSOxREF is set, for example, to a value that corresponds to a condition wherein the absorption capacity of the NOx absorbent is reduced to approximately ½ that of a brand new product.

In the processing in FIG. 4, when the volume of the SOx that is absorbed by the NOx absorbent exceeds the permissible value, the deterioration flag FDSOx is set to "1." As a result, program control jumps from step S34 to S36. When the catalyst temperature TCAT is low (TCAT≦STCAT2), the elevation of the temperature of the NOx absorbent is accelerated by performing the short-interval air-fuel ratio variation (step S38, and steps S13 and S23 in FIG. 2). When TCAT>STCAT2, the SOx removing process is initiated (step S37, and steps S12 and S24 in FIG. 2).

Figure 5:
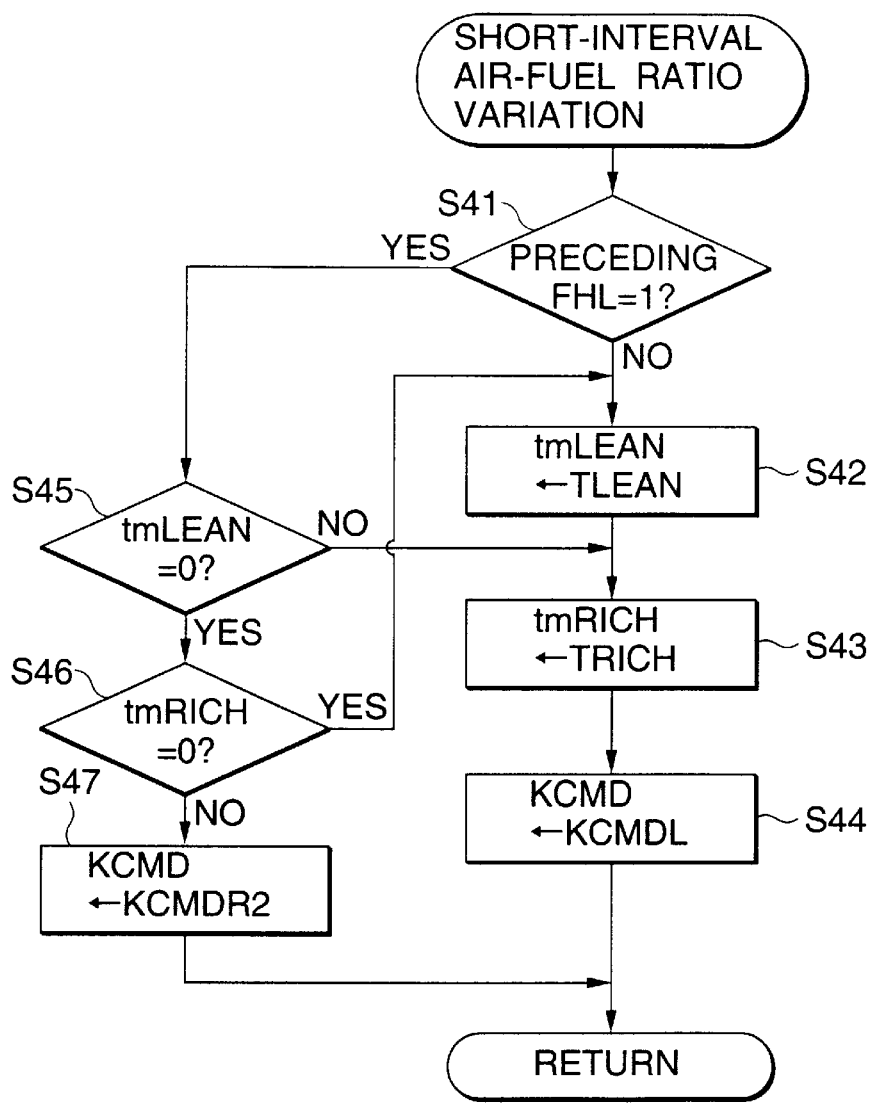
FIG. 5 is a flowchart showing the processing performed to execute short-interval air-fuel ratio variation control.

FIG. 5 is a flowchart showing the short-interval air-fuel ratio variation control executed at step S22 in FIG. 2.

At step S41, a check is performed to determine whether the specific operating state flag FHL was set to "1" during the preceding processing performed in FIG. 2. When FHL=0, a lean time TLEAN (e.g., 1 second) is set for a count-down timer tmLEAN that counts the continuous lean operating time, and the count-down timer tmLEAN is started (step S42). Then, a rich time TRICH (e.g., 0.2 seconds) is set for a count-down timer tmRICH that counts the continuous rich operating time, and the count-down timer tmRICH is started (step S43). Following this, the target air-fuel ratio coefficient KCMD is set to a predetermined lean value KCMDL that corresponds to an air-fuel ratio of approximately 22 (step S44). The processing is thereafter terminated.

Since from now on the decision at step S41 is affirmative (YES), program control advances to step S45, whereat a check is performed to determine whether the value of the timer tmLEAN is "0." Since initially tmLEAN>0, program control shifts to step S43, and the lean operation is continued. When tmLEAN=0 at step S45, at step S46 a check is performed to determine whether the value of the timer tmRICH is "0." Since initially tmRICH>0, the target air-fuel ratio KCMD is set to a predetermined rich value KCMDR2 that corresponds to an air-fuel ratio of approximately 11 (step S47). The processing is thereafter terminated. The processing at step S41 and steps S45, S46 and S47 is repeated until tmRICH=0, while the performance of the rich operation is continued. Then, when tmRICH=0, program control returns from step S46 to S42.

Figure 6:
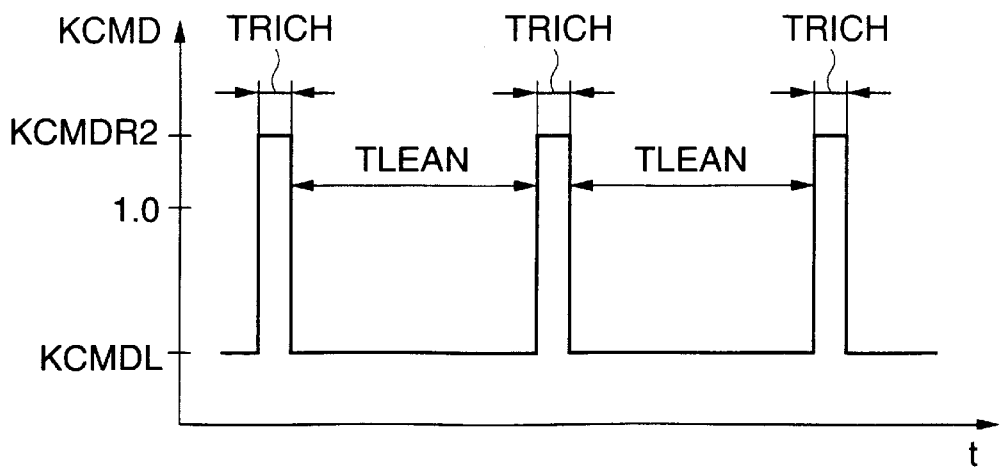
FIG. 6 is a time chart for explaining the process in FIG. 5.

Through the processing performed in FIG. 5, the short-interval air-fuel ratio variation control processing, as is shown in FIG. 6, is performed whereby the lean operation for the lean time TLEAN and the rich operation for the rich time TRICH are repeated.

Figure 7:
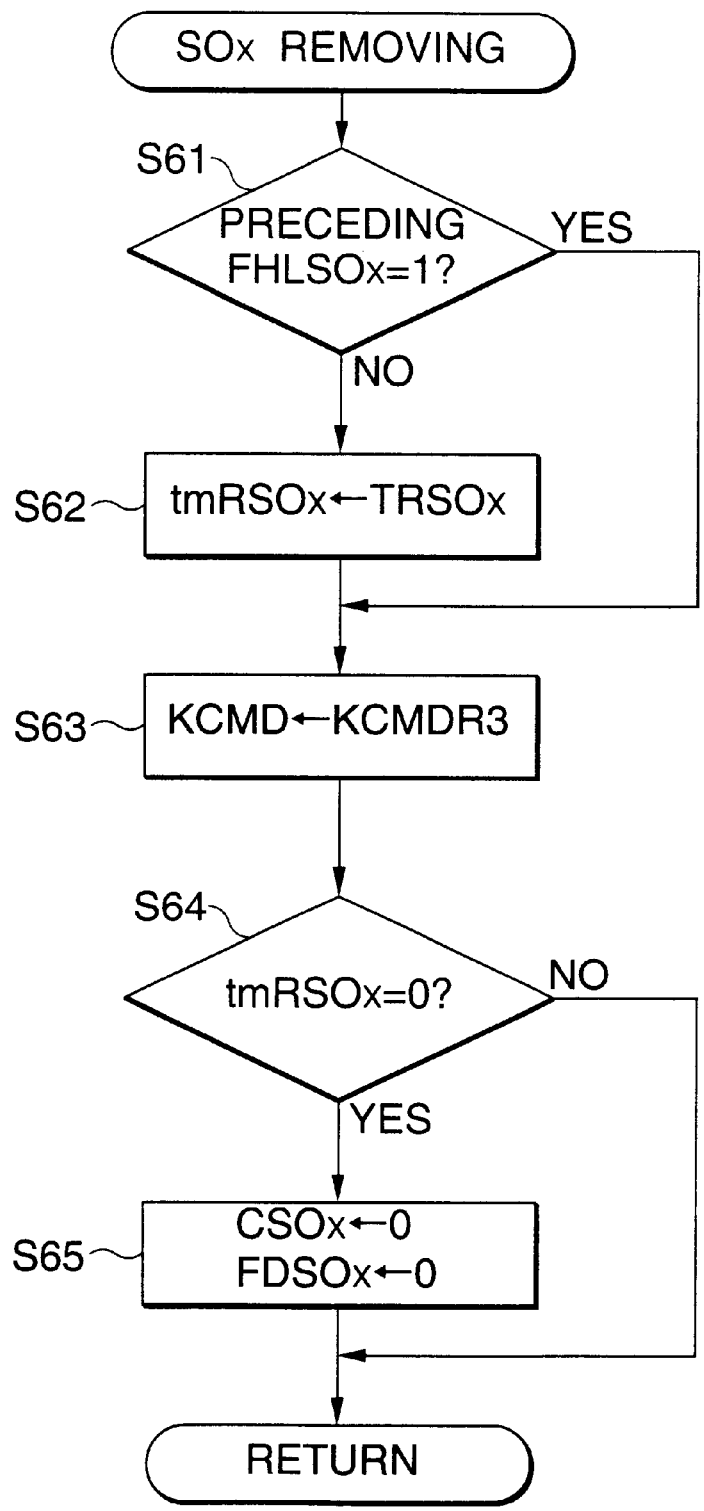
FIG. 7 is a flowchart showing the processing performed to remove SOx that has been absorbed by the NOx absorbent.

FIG. 7 is a flowchart showing the SOx removing processing performed at step S24 in FIG. 2.

At step S61, a check is performed to determine whether a SOx removing flag FHLSOx was set to "1" during the preceding processing in FIG. 2. When FHLSOx=0, i.e., when the state FHLSOx=0 is shifted to the state FHLSOx=1, a deterioration recovery time TRSOx (e.g., 8 minutes) is set for a count-down timer tmRSOx that counts the time for the continuous rich operation for SOx removing (step S62). Program control then advances to step S63. The next processing time, program control jumps from step S61 to step S63.

At step S63, the target air-fuel ratio coefficient KCMD is set to a predetermined SOx reduction rich value KCMDR3 that corresponds to an air-fuel ratio of approximately 11.

Then, a check is performed to determine whether the value of the time tmRSOx is "0" (step S64). When tmRSOx>0, the processing is terminated. When tmRSOx=0, the SOx counter CSOx is reset, the deterioration flag FDSOx is set to "0" (step S65), and the processing is thereafter terminated. However, when the processing at step S65 is performed, the SOx removing flag FHLSOx is again set to "0" (steps S34, S35 and S38 in FIG. 3), and the SOx removing processing is terminated.

Figure 8A:
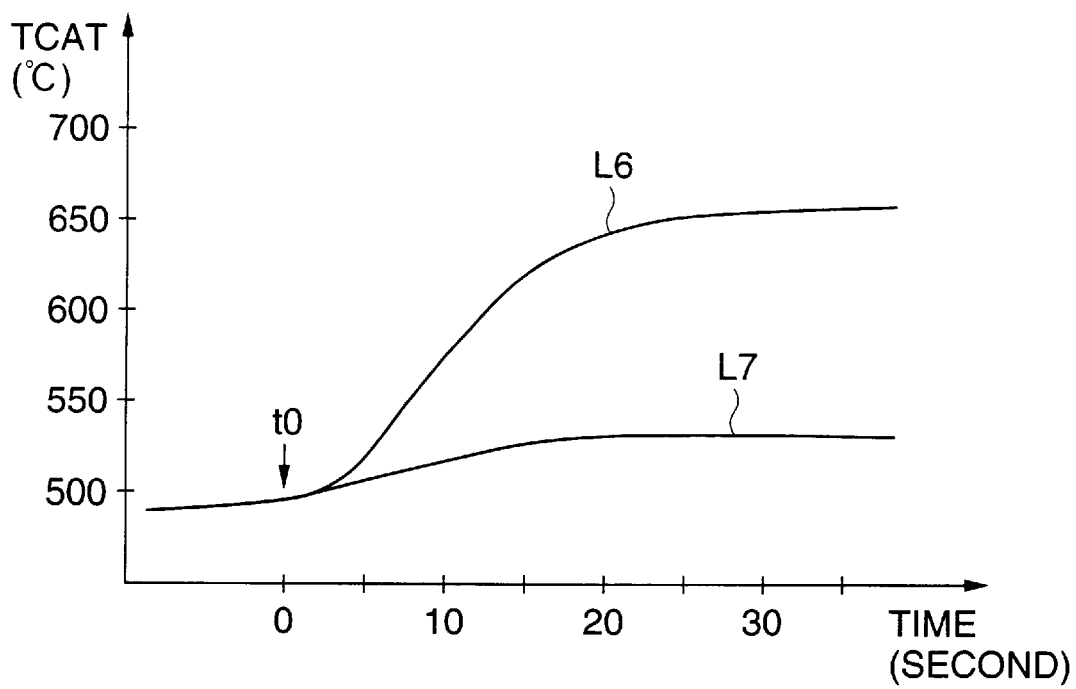
FIGS. 8A and 8B are time charts for explaining the temperature elevation characteristic of the NOx purifying device.
Figure 8B:
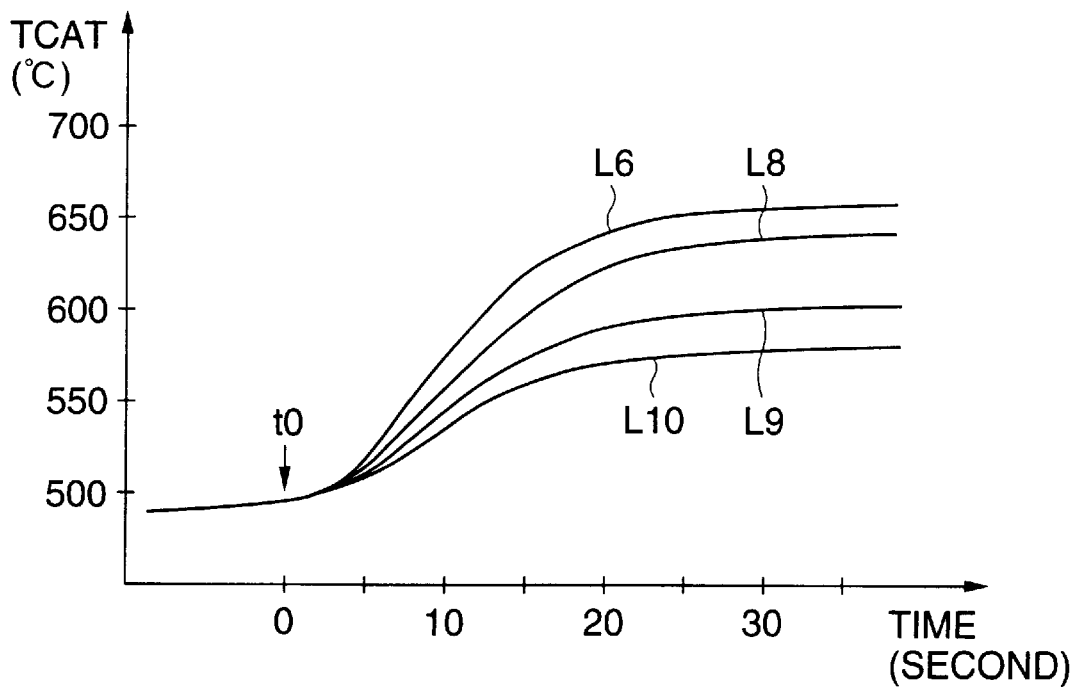

FIGS. 8A and 8B are diagrams showing example temperature elevation characteristics for the catalyst temperature TCAT when the air-fuel ratio variation control processing is started at time t0. Line L6 in FIG. 8A corresponds to a case wherein the short-interval air-fuel ratio variation control processing (a lean time of 1 second and a rich time of 0.26 second) is performed. Line L7 corresponds to a case wherein the long-interval air-fuel ratio variation control processing (a lean time of 10 seconds and a rich time of 2 seconds) is performed. As is apparent from this graph, by using the short-interval air-fuel ratio variation control processing, the elevation of the catalyst temperature TCAT can be completed in a shorter time than when the long-interval air-fuel ratio variation control processing is employed. Thus, this variation control processing is an effective to remove SOx when sulfur contamination of the NOx absorbent has occurred. That is, since discharge of the SOx absorbed by the NOx absorbent is more easily effected as the temperature of the NOx absorbent rises, the SOx absorbed by the NOx absorbent can be easily purified by using the short-interval air-fuel ratio variation control processing.

FIG. 8B is a graph showing the temperature elevation characteristic obtained when the air-fuel ratio in the rich operation is changed while the short-interval air-fuel ratio variation control processing is being used. Line L6, which is the same as line L6 in FIG. 8A, represents the characteristic when the rich air-fuel ratio is 11, and lines L8, L9 and L10 represent the characteristics when the rich air-fuel ratio is 12, 13 and 14.5, respectively. According to these characteristics, as the rich air-fuel ratio is small (a richer air-fuel ratio is set), the temperature elevation of the NOx absorbent can be accelerated, and the temperature in the normal state can be increased. Since at the rich air-fuel ratio of 13 the catalyst temperature TCAT reaches the deterioration recovery temperature STACT2 (about 600° C.) at which SOx is discharged, the rich air-fuel ratio must be lower than 13, and preferably is approximately 11.

As is described above, in this embodiment, when the value of the SOx counter CSOx, which corresponds to the volume of the SOx that is absorbed by the NOx absorbent in FIG. 4, exceeds the permissible value CSOxREF, the deterioration flag FDSOx is set to "1," and the short-interval air-fuel ratio variation control processing in FIG. 5 is initiated to accelerate the elevation of the temperature for the NOx absorbent. When, in the specific operating state, the catalyst temperature TCAT, i.e., the temperature of the NOx absorbent, exceeds the deterioration recovery temperature STCAT2, the SOx removing process in FIG. 6 is performed. For the deterioration recovery time TRSOx, the air-fuel ratio is maintained richer than the stoichiometric air-fuel ratio (KCMD=KCMDR3), and SOx is purified from the NOx absorbent. In this embodiment, since the short-interval air-fuel ratio variation control processing is introduced, the temperature of the NOx absorbent can be quickly increased until it is high enough to discharge SOx, and the removing of SOx can be efficiently and satisfactorily performed. As a result, a preferable exhaust gas characteristic can be maintained for an extended period of time.

An explanation will now be given, while referring to FIGS. 9 and 10, for a NOx purifying rate that is obtained by employing the short-interval air-fuel ratio variation control processing.

Figure 9:
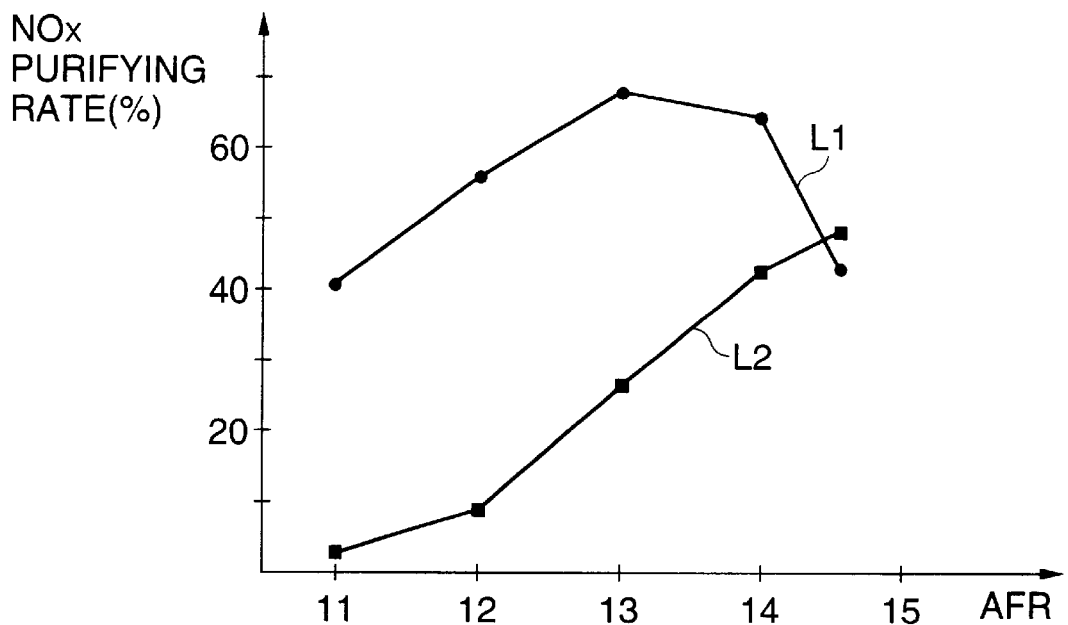
FIG. 9 is a diagram for explaining the NOx purifying ratio when the short-interval air-fuel ratio variation control is executed.

FIG. 9 is a graph showing the NOx purifying rate in an operating state wherein the catalyst temperature TCAT is a high temperature of about 570° C., and wherein a high load is imposed on the engine 1, i.e., in the specific operating state. The horizontal axis represents the air-fuel ratio AFR during a rich operation that corresponds to the predetermined rich value KCMDR1 or KCMDR2. Line L1 represents the characteristic obtained when the short-interval air-fuel ratio variation control is executed, and line L2 represents the characteristic obtained when the long-interval air-fuel ratio variation control (which corresponds to the conventional alternation between a lean operation and a reduction rich operation), for alternating between a lean operating time of 10 seconds and a rich operating time of 2 seconds, is executed while the NOx absorbent is not contaminated with sulfur. As is apparent from this graph, in the specific operating state, when a comparison is made with the conventional long-interval air-fuel ratio variation control processing, a higher NOx purifying ratio can be obtained by executing the short-interval air-fuel ratio variation control. In addition, when the NOx absorbent is contaminated with sulfur, considerable deterioration of the characteristic of line L2 occurs, but the characteristic of line L1 can be obtained without requiring the use of the NOx absorption/discharge function for the NOx absorbent. Thus, since the characteristic for line L1 is not adversely affected, even though the NOx absorbent is contaminated, a high NOx purifying ratio can be maintained. FIG. 10 is a graph showing the NOx purifying ratio when the lean time TLEAN is fixed at one second and the rich time TRICH is changed. Lines L3, L4 and L5 correspond to the absolute air-intake-pipe internal pressure when PBA=600 mmHg, 460 mmHg and 310 mmHg. That is, it is apparent that as the engine load is increased (the exhaust gas airflow rate is increased), the NOx purifying ratio for the short-interval air-fuel ratio variation control is also increased, and that the short-interval air-fuel ratio variation control is especially effective in a high-load operating state.

Therefore, when the short-interval air-fuel ratio variation control is executed in the high-load operating state wherein the exhaust gas airflow rate is high, and when a conventional reduction rich operation, i.e., the long-interval air-fuel ratio variation control, is performed in a low-load operating state wherein the exhaust gas airflow rate is low, a high NOx purifying ratio can be obtained across a wide range of engine operating states. Further, sulfur contamination can be eliminated in a high-load operating state.

To execute the short-interval air-fuel ratio variation control, the range for setting the lean time TLEAN and the rich time TRICH will be discussed.

Figure 11:
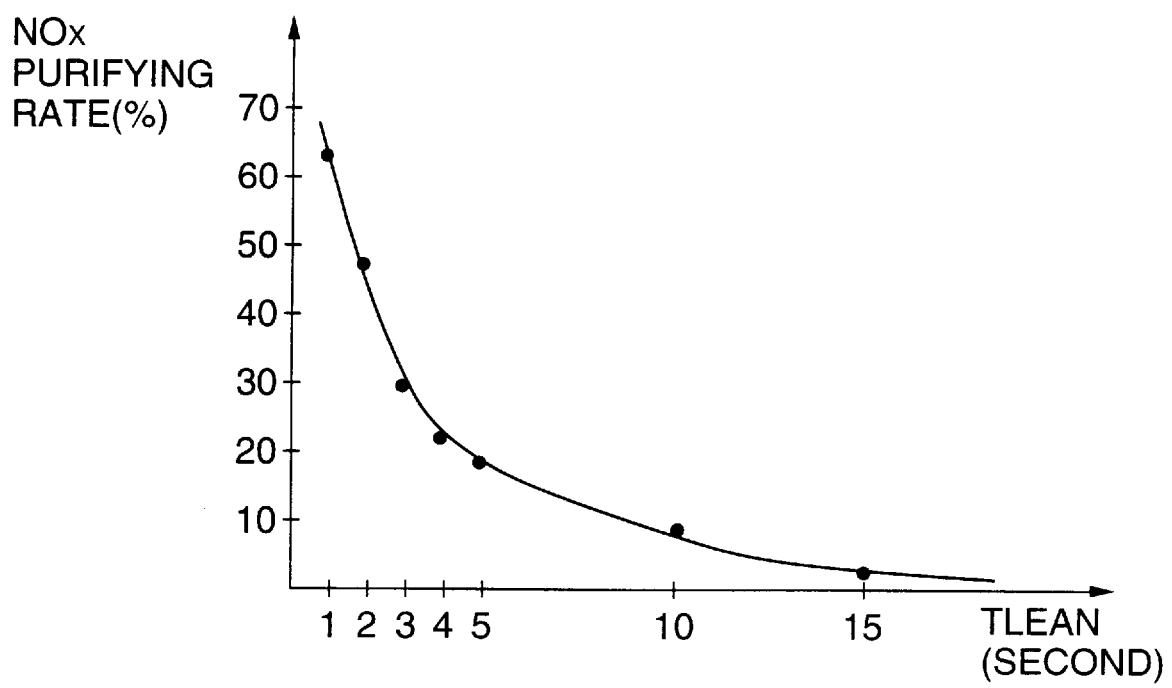
FIG. 11 is a diagram showing a lean time (TLEAN) and the NOx purifying ratio.

FIG. 11 is a graph showing the NOx purifying ratio when the rich time TRICH is fixed to 0.26 seconds and the lean time TLEAN is changed. As is apparent, in consonance with the shortening of the lean time TLEAN, the NOx purifying ratio that is obtained rises. In order to obtain a NOx ratio of 50% or higher, the lean time TLEAN must be set equal to or shorter than two seconds.

Although not apparent from FIG. 11, it is appropriate for the lower limit of the lean time TLEAN to be set to approximately 0.5 seconds. This is because as the lean time TLEAN is reduced, the rich time TRICH must also be reduced in order to provide a satisfactory fuel consumption rate, but when the lean time TLEAN is shorter than 0.5 seconds, it is difficult to reduce the rich time TRICH and a satisfactory fuel consumption rate can not be obtained.

Therefore, it is preferable that the setting for the lean time TLEAN lie between 0.5 to 2 seconds.

It is preferable that, at the maximum, the rich time TRICH be set equal to or smaller than ½ the lean time TLEAN. When the lean time TRICH is longer than ½ the lean time TLEAN, fuel consumption during the lean operation is improved only slightly, and is not very different than that obtained during a stoich operation, for which an air-fuel ratio is set, using the three-way catalyst, that is very nearly the same as the stoichiometric air-fuel ratio.

Figure 10:
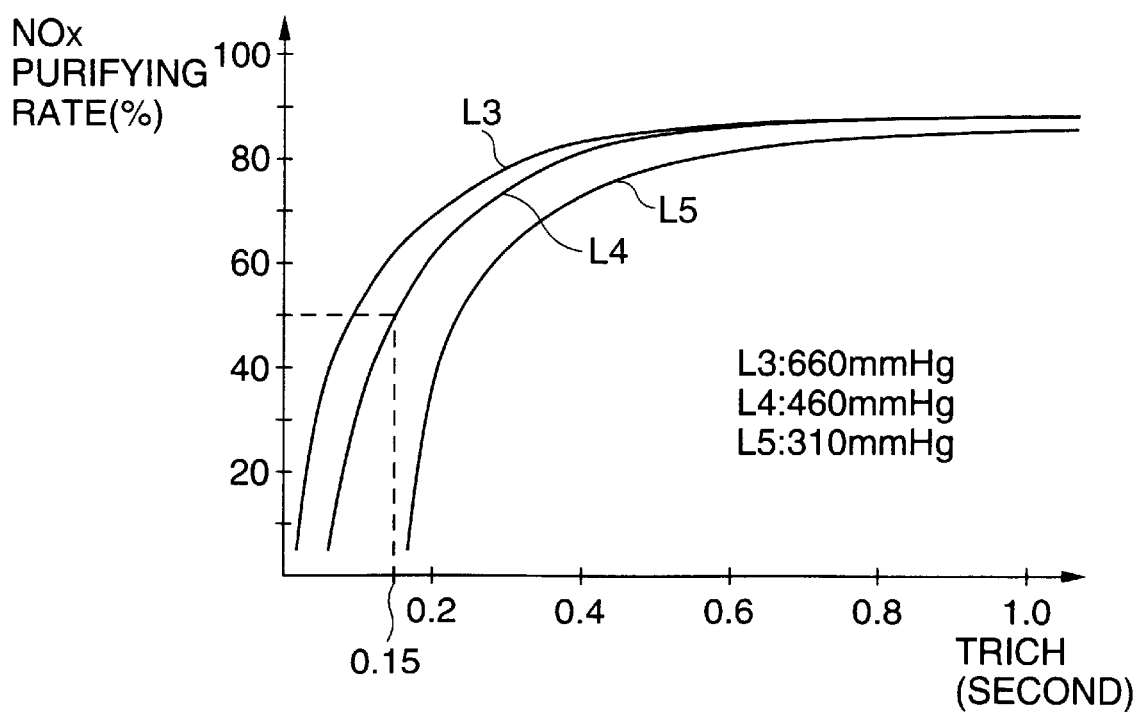
FIG. 10 is a diagram showing a rich time (TRICH) and the NOx purifying ratio.

When the rich time TRICH is reduced while the lean time TLEAN remains constant, the NOx purifying ratio is reduced, as is shown in FIG. 10. In this example, in order to obtain a NOx purifying ratio of 50%, PBA=460 mmHg (line L4) and the rich time TRICH must be equal to or longer than 0.15 seconds (=TLEAN (1 second)/6.7). That is, the lower limit of the rich time TRICH is determined in accordance with the range for setting the specific operating state, and in accordance with the target NOx purifying ratio, and it is difficult to uniquely determine a lower limit.

Assuming that the target NOx purifying ratio is equal to or higher than 40%, and the predetermined pressure SPBA for defining the specific operating state is 460 mmHg, the lower limit of the rich time TRICH is 0.1 second, i.e., TLEAN/10.

Second Embodiment

In a second embodiment, when the catalyst temperature TCAT exceeds the deterioration recovery temperature STCAT2 before the deterioration flag FDSOx has been set to "1," the deterioration recovery time TRSOx is set in accordance with the degree of deterioration of the NOx purifying device 16, i.e., the value of the SOx counter CSOx, and the deterioration recovery time TRSOx is employed for the air-fuel ratio rich operation for reducing SOx.

Figure 12:
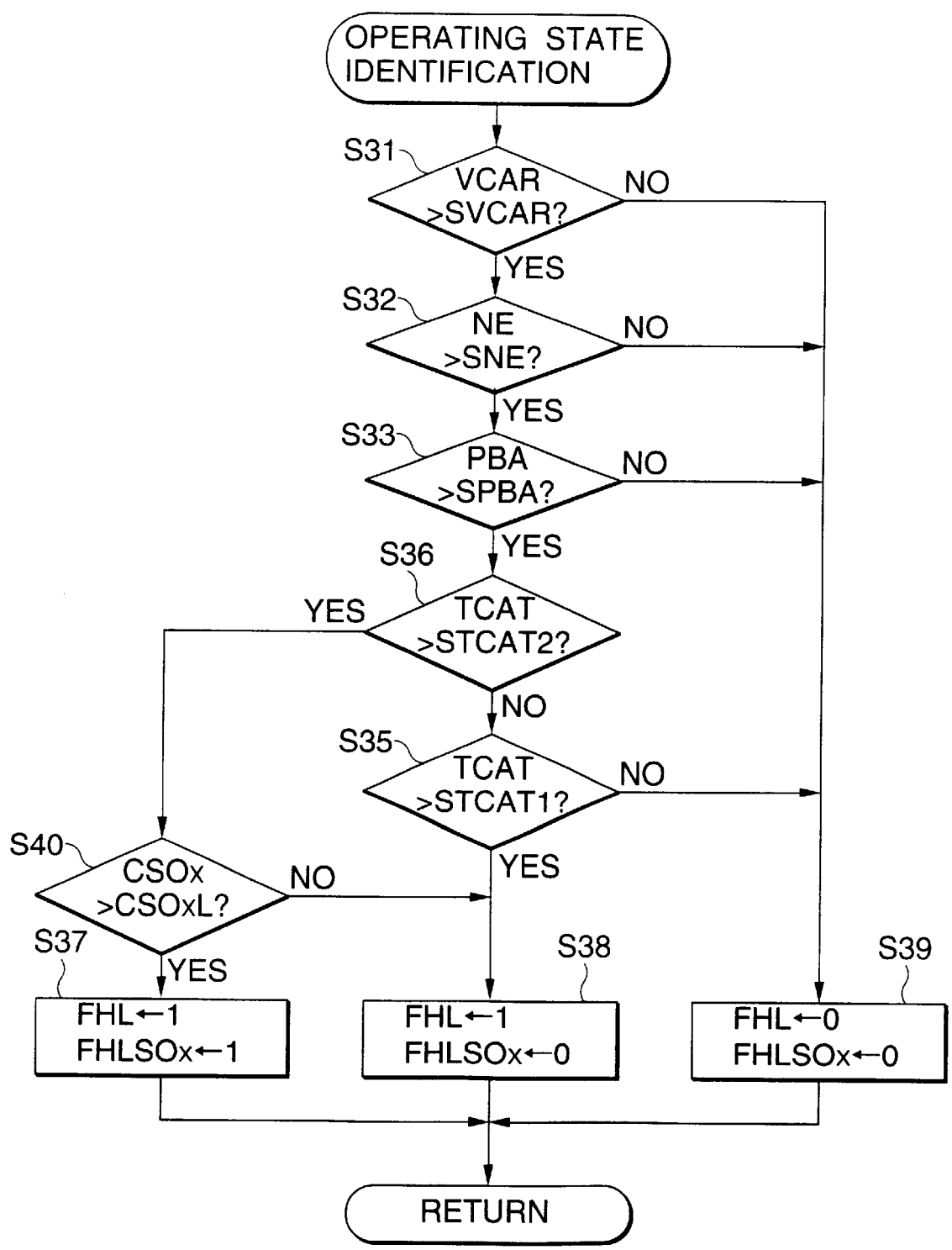
FIG. 12 is a flowchart showing the processing performed for a second embodiment to identify a specific operating state and an operating state that is appropriate for the purifying of SOx.
Figure 13:
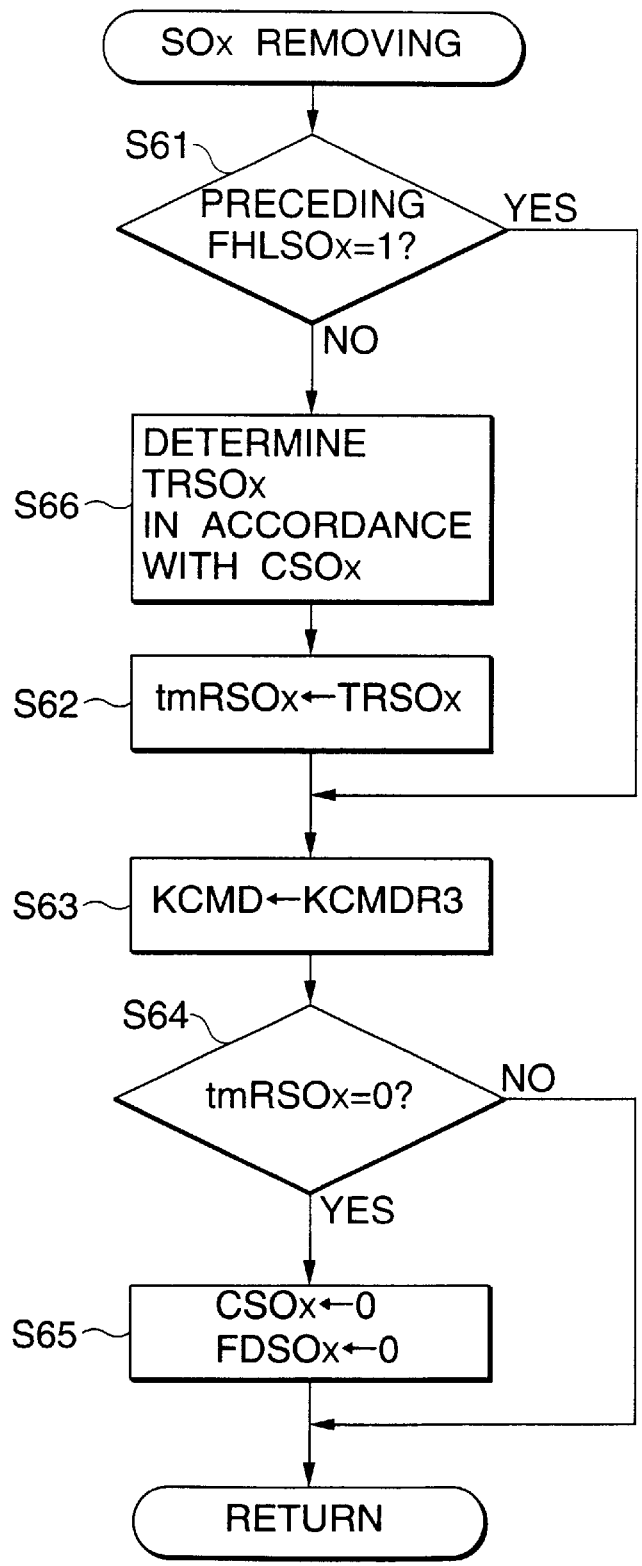
FIG. 13 is a flowchart showing the processing performed for the second embodiment to remove the SOx that has been absorbed by the NOx absorbent.

In this embodiment, the operating state identification process in FIG. 12 is performed instead of the operating state identification process in FIG. 3, and instead of the SOx removing process in FIG. 7, the SOx removing process in FIG. 13 is performed by the CPU 5b. This embodiment is the same as the first embodiment, except that the processes in FIGS. 12 and 13 are performed instead of the processes in FIGS. 3 and 7.

For the operating state identification processing in FIG. 12, step S36 in FIG. 3 is used in place of step S34, and step S40 is added between steps S36 and S37. The other steps in this processing are the same as those for in the processing in FIG. 3.

When decisions at steps S31 to S33 are affirmative (YES), a check is performed to determine whether the catalyst temperature TCAT is higher than the deterioration recovery temperature STCAT2 (step S36). When TCAT>STACT2, program control shifts to step S40, and when TCAT≦STCAT2, program control advances to step S35.

At step S40, a check is performed to determine whether the value of the SOx counter CSOx is greater than the lower threshold value CSOxL. When CSOx≦CSOxL, program control is shifted to step S38, whereat the SOx removing flag FHLSOx is set to "0" to inhibit the SOx removing process. When CSOx>CSOxL, program control advances to step S37, whereat the SOx removing flag FHLSOx is set to "1" to initiate the SOx removing process.

Since the catalyst temperature TCAT is higher than the deterioration recovery temperature STCAT2 when the SOx removing process has been completed, step S40 is performed to prevent the SOx removing process from being started again. The lower threshold value CSOxL is set, for example, to ⅒ the permissible value CSOxREF.

Generally, in the processing in FIG. 12, when the decisions at steps S31 to S33 are affirmative (YES) and when the catalyst temperature TCAT exceeds the deterioration recovery temperature STCAT2, the SOx removing flag FHLSOx is set to "1," regardless of the setting for the deterioration flag FDSOx, and the SOx removing process is performed. However, so long as the value of the SOx counter CSOx is equal to or smaller than the lower threshold value CSOxL the SOx removing process is not performed, even when the decisions at steps S31 to S33 are affirmative (YES).

The SOx removing process in FIG. 13 is the same as the process in FIG. 7, except that step S66 is added between steps S61 and S62 in FIG. 7.

Immediately after the SOx removing flag FHLSOx is shifted from "0" to "1," first, the timing for the deterioration recovery time TRSOx is set in accordance with the value held by the SOx counter CSOx (step S66). The timing for the deterioration recovery time TRSOx is lengthened in consonance with any increase in the value held by the SOx counter CSOx.

At step S62, the deterioration recovery time TRSOx set at step S66 is used as the timing set for the count-down timer tmRSOx, which is then started.

In the processing in FIG. 13, the rich air-fuel ratio is maintained for the deterioration recovery time TRSOx, which is consonant with the degree of deterioration of the NOx purifying device 16, i.e., the value held by the SOx counter CSOx that corresponds to the volume of SOx absorbed by the NOx purifying device 16, and the SOx removing process is performed.

As is described above, in this embodiment, the short-interval air-fuel ratio variation control is executed in the specific operating state of the engine 1, and the elevation of the temperature of the NOx absorbent is accelerated. When the exhaust gas airflow rate is high (the decisions at steps S31 to S33 in FIG. 12 are affirmative (YES)), and the catalyst temperature TCAT is higher than the deterioration recovery temperature STCAT2, the deterioration recovery time TRSOx is set in accordance with the degree of deterioration of the NOx purifying device 16, i.e., the value held by the SOx counter CSOx, and the air-fuel ratio rich operation for reducing the SOx is performed for the deterioration recovery time TRSOx. Therefore, the SOx absorbed by the NOx absorbent can be purified efficiently, and a preferable exhaust gas characteristic can be maintained for an extended period of time.

Third Embodiment

In a third embodiment, when the sulfur contamination of the NOx absorbent is advanced and the value held by the SOx counter CSOx reaches the permissible value CSOxREF, short-interval air-fuel ratio variation control is executed for a predetermined temperature elevation time TSR, and the SOx removing process is then initiated. Specifically, in this embodiment, the SOx removing process is performed while it is assumed that the catalyst temperature TCAT, by executing the short-interval air-fuel ratio variation control for the predetermined temperature elevation time TSR, has reached the deterioration recovery temperature STCAT2. The time required for the catalyst temperature TCAT to be raised by the short-interval air-fuel ratio variation and to reach the temperature appropriate for the SOx removing is measured, and the predetermined temperature elevation time TSR is set in accordance with the time that is obtained (to the average value+target deviation× 3, for example).

Figure 14:
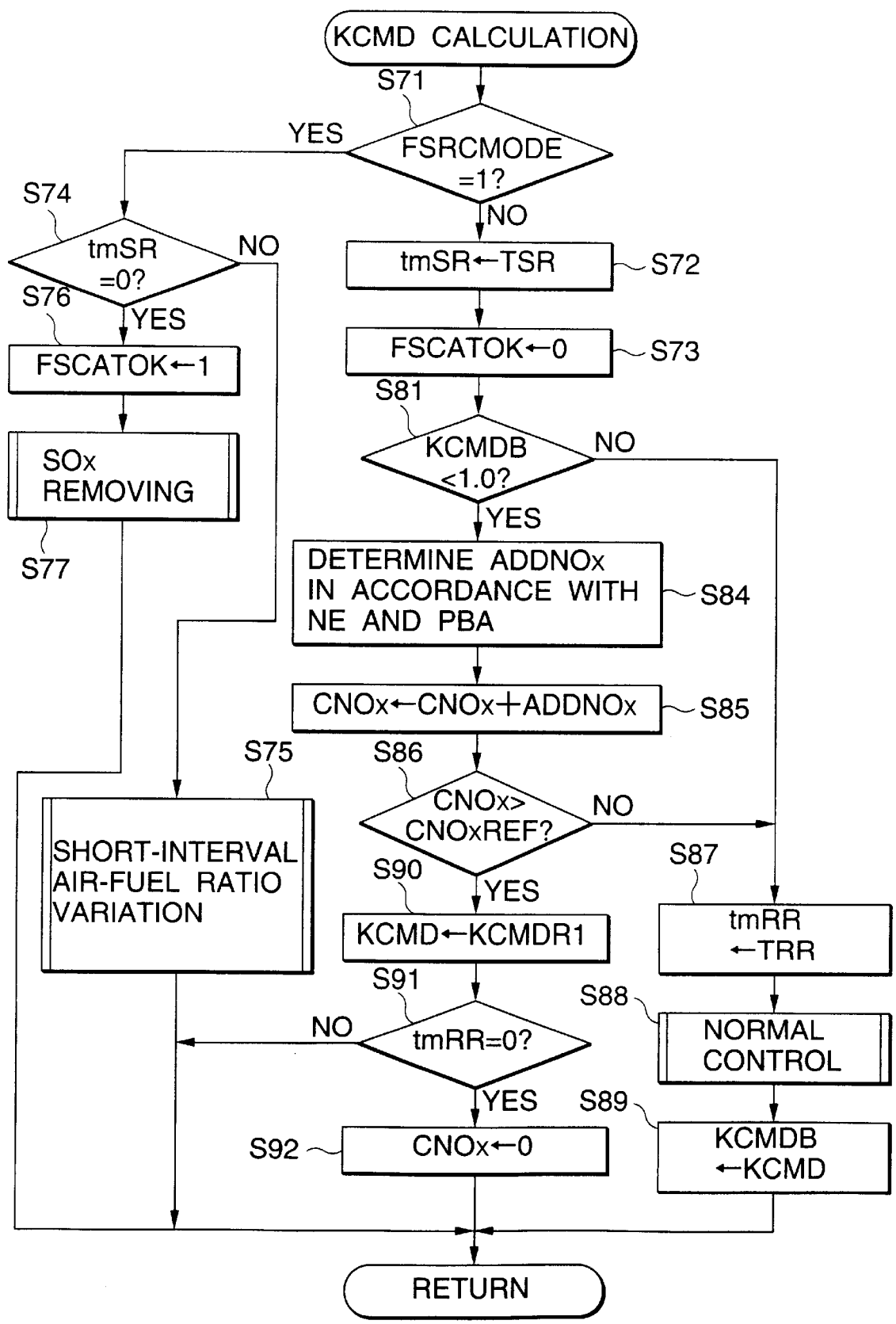
FIG. 14 is a flowchart showing the processing performed for a third embodiment to set a target air-fuel ratio coefficient (KCMD)
Figure 15:
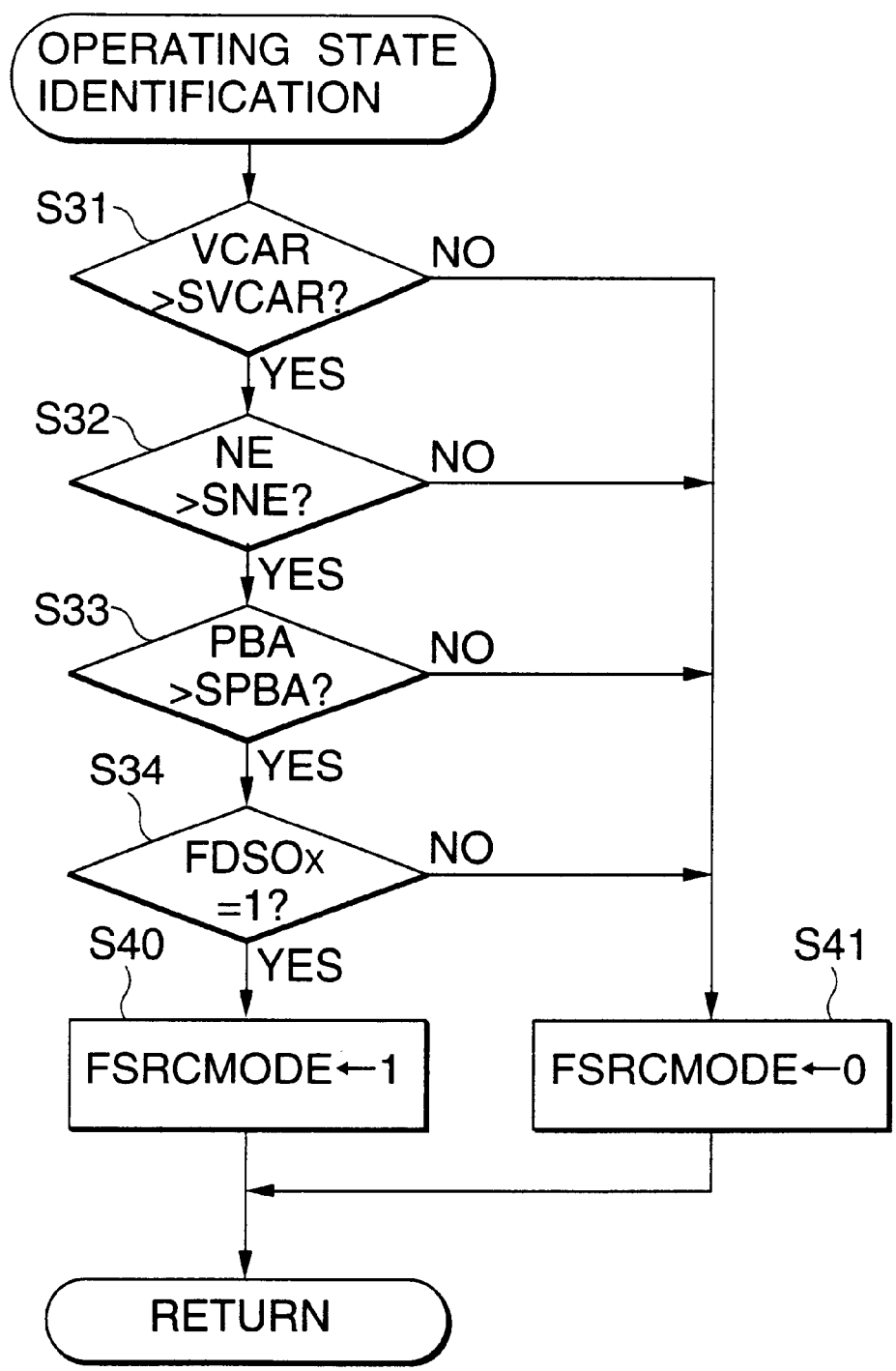
FIG. 15 is a flowchart showing the processing performed for the third embodiment to identify a deterioration recovery mode for the NOx absorbent.
Figure 16:
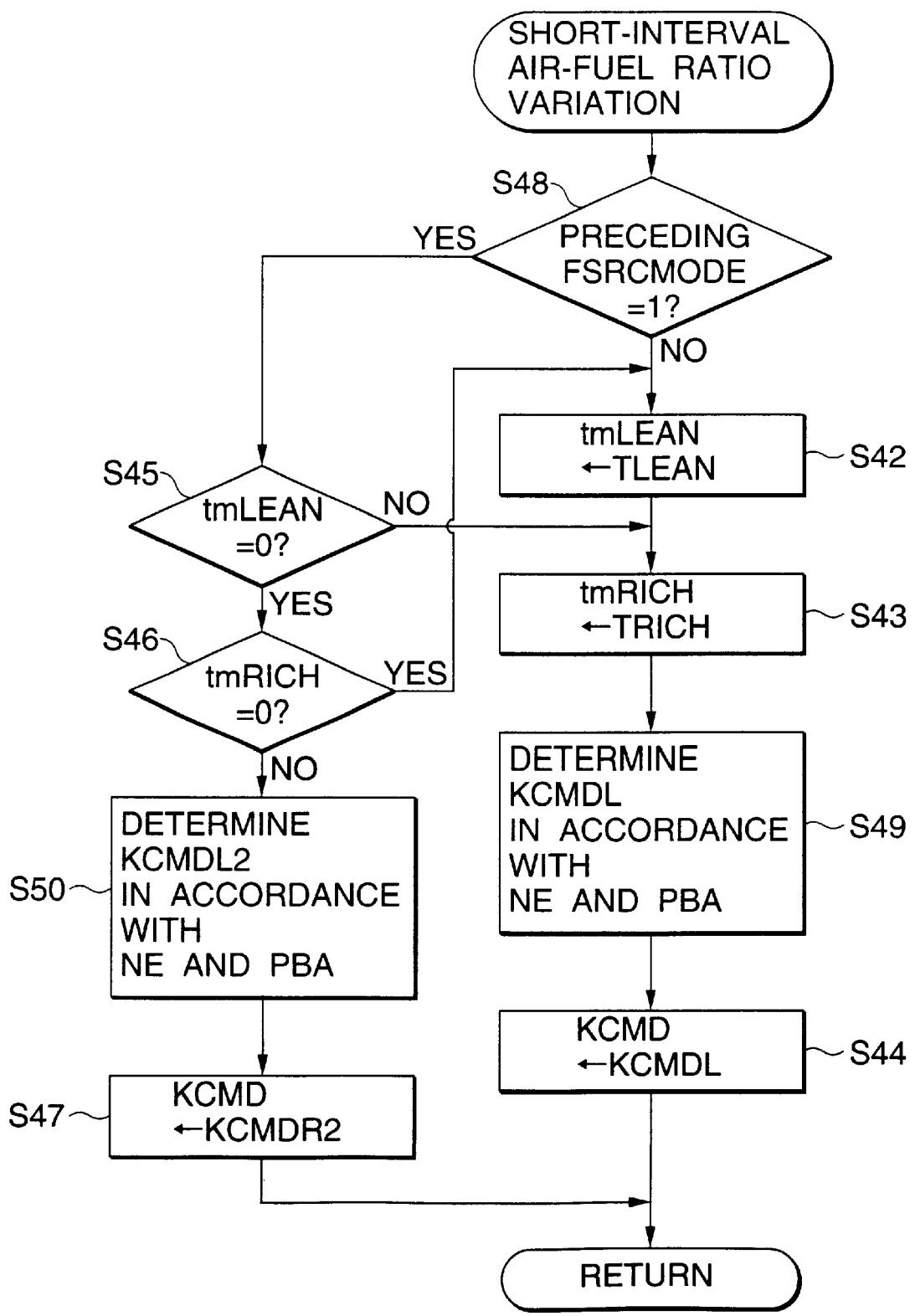
FIG. 16 is a flowchart showing the short-interval air-fuel ratio variation processing performed according to the third embodiment.
Figure 17:
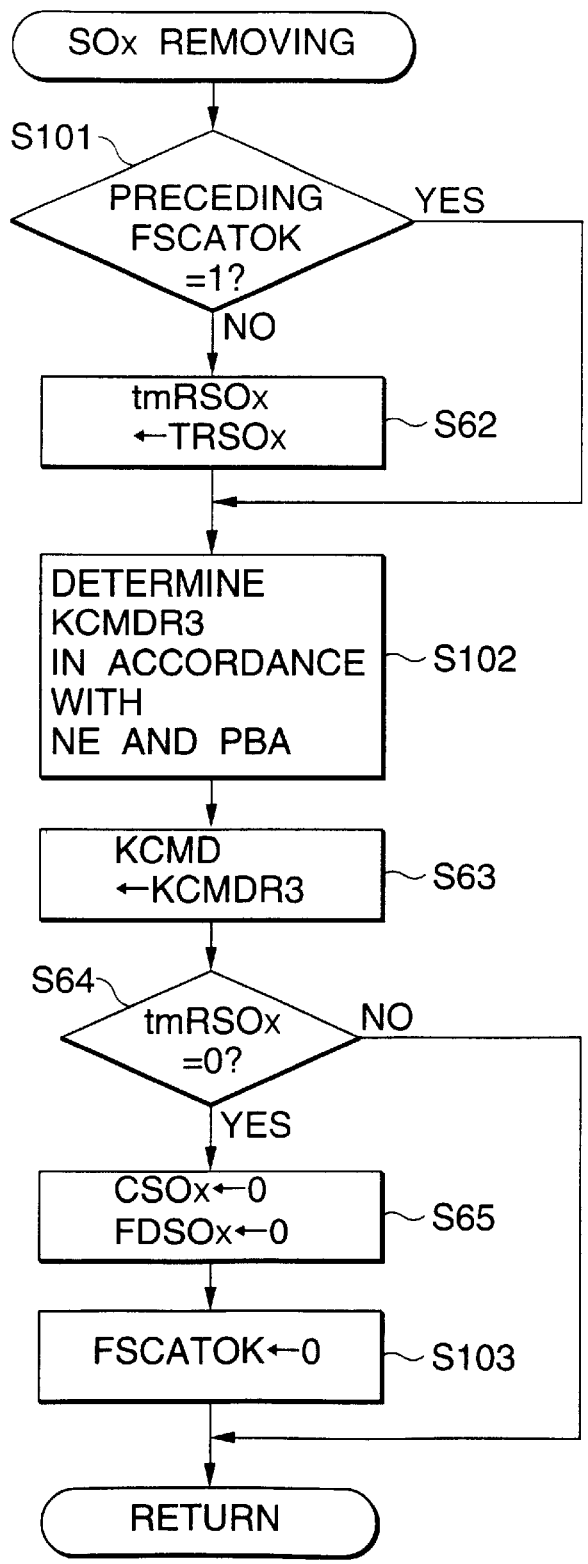
FIG. 17 is a flowchart showing the processing performed for the third embodiment to remove SOx that has been absorbed by the NOx absorbent.

In this embodiment, the CPU 5b performs the KCMD calculation process in FIG. 14, the operating state identification process in FIG. 15, the short-interval air-fuel ratio variation control in FIG. 16 and the SOx removing process in FIG. 17, instead of the KCMD calculation process in FIG. 2, the operating state identification process in FIG. 3, the short-interval air-fuel ratio variation control in FIG. 5 and the SOx removing process in FIG. 7. This embodiment is substantially the same as the first embodiment, except that the processes in FIGS. 14 to 17 are performed instead of the processes in FIGS. 2, 3, 5 and 7.

FIG. 14 is a flowchart showing the KCMD calculation processing in this embodiment. Steps S81, and S84 to S92 in FIG. 14 are the same as steps S11, and S14 to S22 in FIG. 2, respectively.

At step S71, a check is performed to determine whether the deterioration recovery mode flag FSRCMODE that was set at step S15 equals "1," which indicates the deterioration recovery mode of the NOx absorbent. When FSRCMODE=0, the predetermined temperature elevation time TSR (e.g., 60 seconds) is used to set the timing for the count-down timer tmSR that measures the time for the execution of the short-interval air-fuel ratio variation control, and the timer tmSR is started (step S72). A "0" is set for a SOx removing execution flag FSCATOK that indicates, as "1," that the SOx removing process is being performed (step S73). The process at step S81 and the following steps is performed.

When FSRCMODE=1 at step S71, a check is performed to determine whether the value of the timer tmSR is "0" (step S74). When tmSR>0, program control advances to step S75, whereat the short-interval air-fuel ratio variation control is executed. When tmSR=0, it is assumed that the catalyst temperature TCAT has been raised to a temperature that is appropriate for the purifying of SOx, and the SOx removing execution flag FSCATOK is set to "1" (step S76). The SOx removing process is then initiated (step S77).

FIG. 15 is a flowchart showing the engine operating state identification process for setting the deterioration recovery mode flag FSRCMODE that is referred to at step S71 in FIG. 14. In this process, steps S40 and 41 are used in place of steps S35 to S39 for the engine operating state identification process in FIG. 3. That is, in this process, when the decisions at step S31 to S34 are affirmative (YES), i.e., when the exhaust gas airflow rate is high and the deterioration flag FDSOx is set to "1," the deterioration recovery mode flag FSRCMODE is set to "1," and when one of the decisions at steps S31 to S34 is negative (NO), the deterioration recovery mode flag FSRCMODE is set to "0." When the deterioration recovery mode flag FSRCMODE has been set to "1," the process at step S74 and the following steps in FIG. 2, i.e., the short-interval air-fuel ratio variation process, and the SOx removing process are performed, and the SOx accumulated in the NOx absorbent is purified.

FIG. 16 is a flowchart showing the short-interval air-fuel ratio variation process at step S75 in FIG. 14. For this process, step S41 in FIG. 5 is replaced with step S48, and the additional steps S49 and S50 are inserted. For the other portions, this process is the same as the process in FIG. 5.

In this embodiment, since the execution condition for the short-interval air-fuel ratio variation is the deterioration recovery mode flag FSRCMODE=1, at step S48 the specific operating state flag FHL at step S41 in FIG. 5 is replaced by the deterioration recovery mode flag FSRCMODE.

At step S48, a check is performed to determine whether the preceding deterioration recovery mode flag FSRC-MODE equaled "1." When FSRCMODE=0, i.e., when the flag FSRCMODE has been just shifted from "0" to "1," program control advances to step S42, and the next time, is shifted from step S48 to step S45.

At step S49, the predetermined lean value KCMDL is determined in accordance with the engine revolutions NE and the absolute air-intake-pipe internal pressure PBA. At step S44, the predetermined lean value KCMDL, which is determined at step S49, is used to set the target air-fuel ratio coefficient KCMD. At step S50, the predetermined rich value KCMDR2 is determined in accordance with the engine revolutions NE and the absolute air-intake-pipe internal pressure PBA, and at step S47, the predetermined rich value KCMDR2, which is determined at step S50, is used to set the target air-fuel ratio coefficient KCMD.

Through the process in FIG. 16, as well as the process in FIG. 5, the short-interval air-fuel ratio variation control processing is performed, and also, in this embodiment, the predetermined lean value KCMDL and the predetermined rich value KCMDR2 are set in accordance with the engine operating state, so that in accordance with the engine operating state an optimal air-fuel ratio can be designated.

FIG. 17 is a flowchart showing the SOx removing process at step S77 in FIG. 14. For this process, step S61 in FIG. 7 is replaced by step S101, and the additional steps S102 and S103 are inserted. For the other portions, this process is the same as the process in FIG. 7.

At step S101, a check is performed to determine whether the preceding SOx removing execution flag FSCATOK equaled "1." When FSCATOK=0, i.e., when the SOx removing execution flag FSCATOK has been just shifted from "0" to "1," the deterioration recovery time TRSOx is used to set the timing for the timer tmRSOx, which is then started (step S62). The next time, program control jumps from step S101 to step S102.

At step S102, the predetermined SOx reduction rich value KCMDR3 is determined in accordance with the engine revolutions NE and the absolute air-intake-pipe internal pressure PBA.

Then, the predetermined rich value KCMDR3 is used to set the target air-fuel ratio coefficient KCMD (step S63). When timer tmRSOx>0, the processing is immediately terminated, and when tmRSOx=0, the counter CSOx and the deterioration flag FDSOx are reset (step S65). In addition, the SOx removing execution flag FSCATOK is also reset (step S103). The processing is thereafter terminated.

Through this process, for the deterioration recovery time TRSOx the predetermined SOx reduction rich value KCMDR3 is used as the target air-fuel ratio coefficient KCMD, and the SOx is removed from the NOx absorbent. Since the predetermined rich value KCMDR3 is determined in accordance with engine revolutions NE and the absolute air-intake-pipe internal pressure PBA, the removing of SOx can be completed within the deterioration recovery time TRSOx, regardless of the engine operating state.

According to this embodiment, when it is ascertained that the NOx absorbent has absorbed SOx and is therefore deteriorated, by using the short-interval air-fuel ratio variation the temperature of the NOx absorbent can be quickly elevated to the deterioration recovery temperature at which the SOx can be discharged, and the SOx can be removed appropriately and efficiently. As a result, a preferable exhaust gas characteristic can be maintained for an extended period of time.

With the arrangement in FIG. 18, wherein a three-way catalyst 18 is located immediately downstream of an engine 1 and a NOx purifying device 16 is located downstream of the three-way catalyst 18 and slightly apart from the engine 1, i.e., under the floor of the occupant space in a vehicle in which the engine 1 is mounted, an explanation will now be given for setting the lean time TLEAN, the rich time TRICH, the lean air-fuel ratio AFL that corresponds to the predetermined lean value KCMDL, and the rich air-fuel ratio AFR that corresponds to the predetermined rich value KCMDR2.

Figures 18, 19A, 19B:
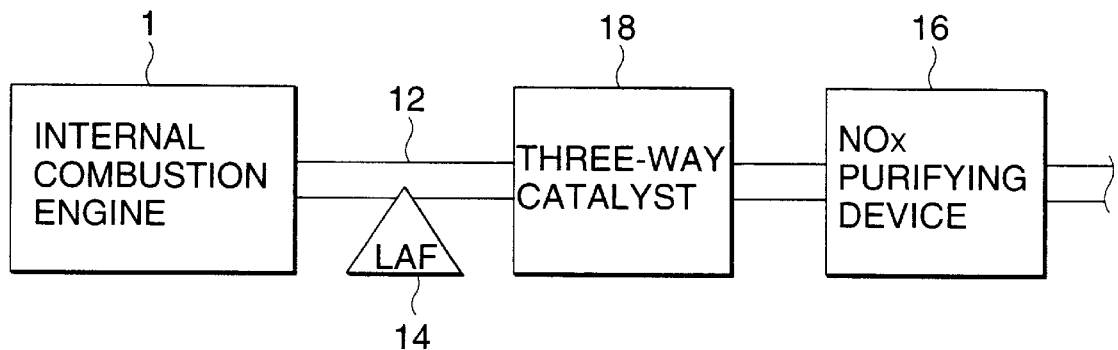
FIG. 18 is a diagram showing the arrangement wherein a three-way catalyst is located upstream of a NOx purifying device.
FIGS. 19A and 19B are graphs for explaining the results of experiments run to determine control parameter values.

FIG. 19A is a diagram for explaining the results obtained by an experiment using various lean time TLEAN and rich time TRICH sets. The columns wherein A to D are entered correspond to the individual sets (hereinafter referred to, for example, as "set A" or "set B"). For set C, i.e., when both the lean time TLEAN and the rich time TRICH are set equal to or shorter than two seconds, a feedback control that is consonant with the output of the LAF sensor is not normally executed because the two times are too short. For set D, i.e., when the lean time TLEAN and the rich time TRICH are unbalanced, the temperature elevation for the NOx absorbent tends to be slow (the temperature elevation speed tends to be reduced). Therefore, it is preferable that, like set A or set B, the variation interval be comparatively long and the lean time TLEAN equal the rich time TRICH; however, for set B, a problem has arisen in that the temperature TCAT of a NOx absorbent that is located under the floor does not attain an appropriate temperature (600° C.) for the purifying of SOx. When the variation interval (TLEAN+TRICH) is extended, the temperature elevation is inadequate. This is assumed to be because there is an increase in the time difference between when the HC and CO elements that are discharged at a rich air-fuel ratio reach the NOx purifying device 16 and when the increase in the oxygen provided by a lean air-fuel ratio reaches it; and because the volumes of the HC and CO that are burnt near the NOx purifying device 16 are reduced.

As is apparent from the results of the experiment, when the importance of a rapid elevation of the temperature of the NOx absorbent located under the floor is the greatest, it is most preferable that the timing set for the lean time TLEAN and the rich time TRICH be 0.3 seconds. As for the engine operating state in the experiment conducted for the results described in FIG. 19, the engine revolutions NE are 2000 rpm, and the absolute air-intake-pipe internal pressure PBA is 660 mmHg.

FIG. 19B is a graph for explaining the results of the experiment using various lean air-fuel ratio AFL and rich air-fuel ratio AFR sets. The columns wherein E to H are entered correspond to the individual sets. Blank columns are those for which the experiment was not conducted.

As previously described, as the rich air-fuel ratio AFR is reduced (is set richer), the temperature of the NOx absorbent is elevated rapidly, and in the normal condition the temperature can be high. However, when the rich air-fuel ratio AFR is too small, as for set G, the temperature of the three-way catalyst 18, which is located upstream, raised too much. Further, when the lean air-fuel ratio AFL is too small, the degree of elevation of the temperature of the NOx absorbent tends to be reduced, so that for set F or H the temperature of the NOx absorbent is elevated too slowly. In addition, for set H, the elevation of the temperature of the three-way catalyst 18 is excessive. Therefore, when the elevation of the temperature for both the three-way catalyst 18 and the NOx absorbent of the NOx purifying device 16 are taken into account, set E, i.e., the lean air-fuel ratio AFL=20 and the rich air-fuel ratio=11, is the most preferable for avoiding an excessive elevation of the temperature elevation of the three-way catalyst 18 and for quickly elevating the temperature of the NOx purifying device 16.

Figure 20A:
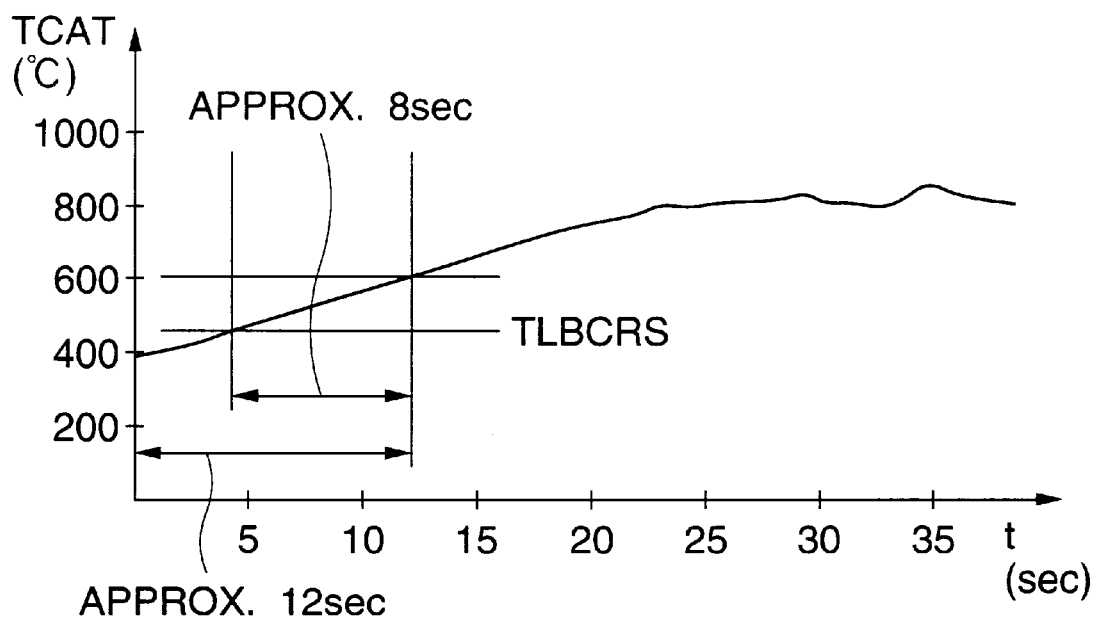
FIGS. 20A and 20B are time charts showing the temperature elevation characteristics of the NOx absorbent and the three-way catalyst.
Figure 20B:
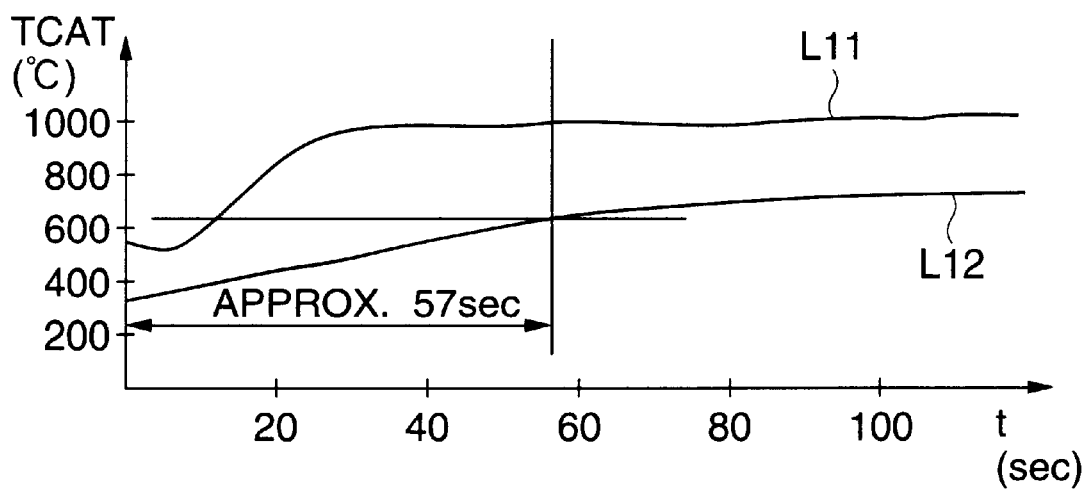

FIGS. 20A and 20B are time charts showing example temperature characteristics in the above described engine operating state (NE=2000 rpm and PBA=660 mmHg), with the lean time TLEAN=the rich time TRICH=0.3 seconds, and the lean air-fuel ratio AFL =20 and the rich air-fuel ratio AFR=11. In FIG. 19A is shown the temperature elevation characteristic of the NOx absorbent that is located under the floor when the three-way catalyst 18 is not provided. When the initial temperature is approximately 390° C., it takes about 12 seconds to reach 600° C. after the initiation of the short-interval air-fuel ratio variation control. TLBCRS in FIG. 19A indicates the temperature (about 430° C.) for the lean operation while in a cruising state, and here it takes about 8 seconds for the temperature TLBCRS to reach 600° C.

In FIG. 19B is shown the temperature elevation characteristic (line L11) of the three-way catalyst 18 and the temperature elevation rise characteristic (line L12) of the NOx absorbent when the arrangement in FIG. 18 is employed. As is apparent, when the three-way catalyst 18 is provided, the elevation of the temperature of the NOx absorbent proceeds quite slowly, and it takes about 57 seconds for it to reach 600° C., measured from the point at which the short-interval air-fuel ratio variation control was initiated.

The present invention is not limited to the above embodiments, and can be variously modified. For example, the process in FIG. 3 for defining the specific operating state of the engine 1 need only include steps S32 and S33 for determining the operating state in accordance with, at the least, the engine revolutions NE and the absolute air-intake-pipe internal pressure PBA, and may not always include steps S31 and S34.

The internal combustion engine is not limited to one for which fuel is injected into the air-intake pipe, and may be one for which fuel is injected directly into the firing chamber of each cylinder.

As is described above, according to the first aspect of the invention, when the deterioration detection unit detects the deterioration of the nitrogen oxide purifying unit, the air-fuel ratio of the air-fuel mixture to be supplied to the engine is varied, at intervals that are set equal to or shorter than a predetermined time, so that it is alternately leaner and richer than the stoichiometric air-fuel ratio. And when the temperature of the nitrogen oxide purifying unit exceeds the deterioration recovery temperature while the air-fuel ratio variation control is being executed, for the deterioration recovery time, the air-fuel ratio is maintained richer than the stoichiometric air-fuel ratio. Therefore, the temperature of the nitrogen oxide purifying unit can be quickly elevated to the deterioration recovery temperature that is appropriate for SOx removing, so that the SOx can be efficiently purified from the nitrogen oxide purifying unit. As a result, a preferable exhaust gas characteristic can be maintained for an extended period of time.

According to the second aspect of the invention, in the specific operating state wherein the exhaust gas airflow rate of the engine is high, the air-fuel ratio of the air-fuel mixture to be supplied to the engine is varied, at intervals that are set equal to or shorter than a predetermined time, so that alternately it is leaner and richer than the stoichiometric air-fuel ratio. And when the temperature of the nitrogen oxide purifying unit exceeds the deterioration recovery temperature, for the deterioration recovery time that is consonant with the detected degree of deterioration, the air-fuel ratio is maintained richer than the stoichiometric air-fuel ratio. Therefore, the temperature of the nitrogen oxide purifying unit can be quickly elevated to the deterioration recovery temperature that is appropriate for SOx removing, so that the SOx can be efficiently purified from the nitrogen oxide purifying unit. As a result, a preferable exhaust gas characteristic can be maintained for an extended period of time.

Fourth embodiment

Figure 21:
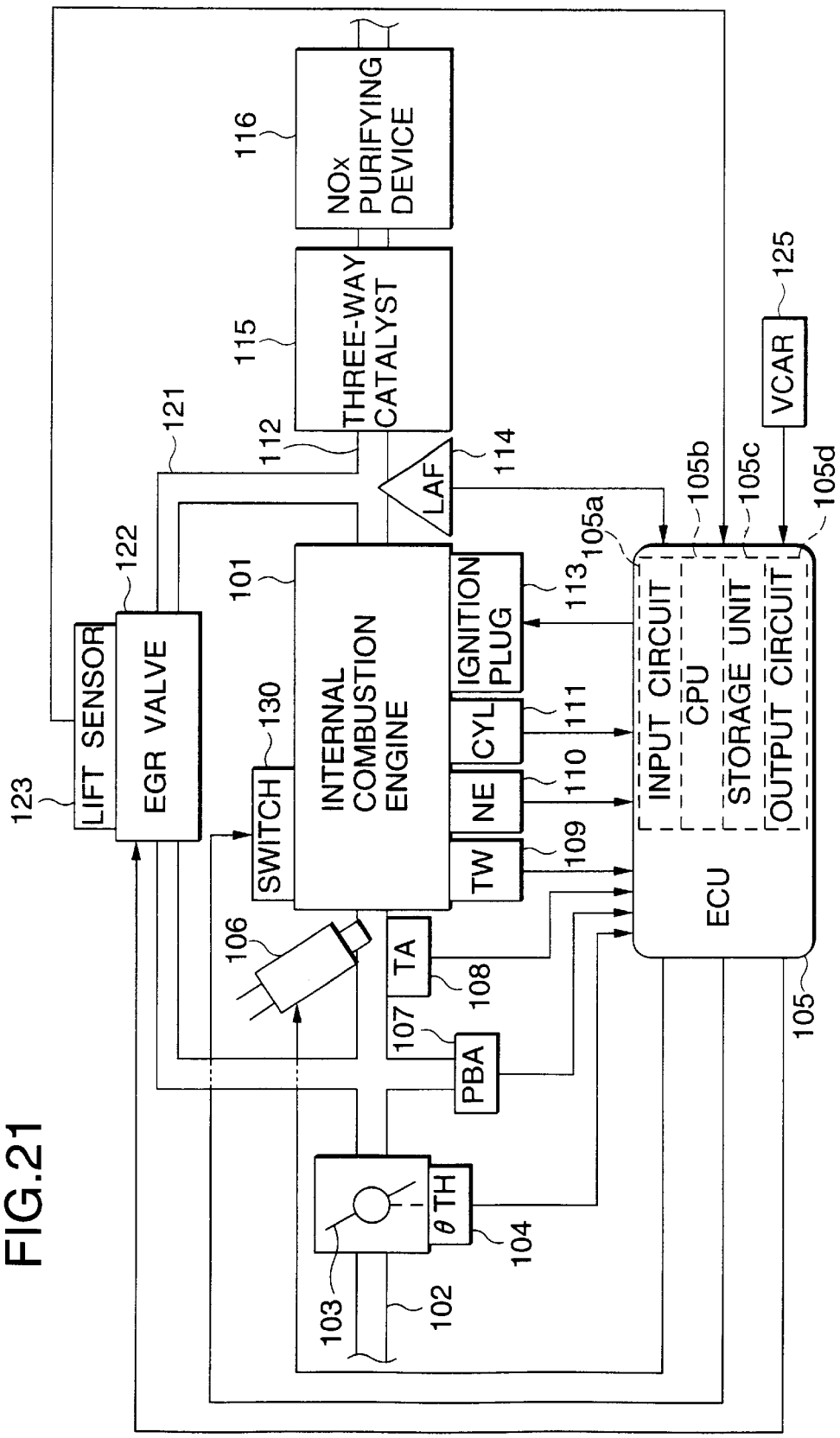
FIG. 21 is a diagram showing the arrangement of an internal combustion engine according to one embodiment of the invention, and a controller therefor.

FIG. 21 is a diagram showing the overall arrangement of an internal combustion engine (hereinafter referred to as an "engine") according to this embodiment of the invention and a controller therefor. A throttle valve 103 is located along the route of an air intake pipe 102 of a four-cylinder engine 1. The throttle valve 103 is connected to a throttle valve travel (θTH) sensor 104, and an electric signal that represents the travel of the throttle valve 103 is output by the sensor 104 to an engine control electronic control unit (hereinafter referred to as an "ECU") 105.

A fuel injection valve 106 is provided, for each cylinder, between the engine 101 and the throttle valve 103 and a little upstream of the air intake valve (not shown) of the air intake pipe 102. Each fuel injection valve 106 is connected to a fuel pump (not shown), and is electrically connected to the ECU 105, so that the time required to open the fuel injection valve 106 is controlled in accordance with a signal from the ECU 105.

An absolute air-intake-pipe internal pressure (PBA) sensor 107 is positioned immediately downstream of the throttle valve 103. An absolute pressure signal is converted by the absolute pressure sensor 107 into an electric signal, which is transmitted to the ECU 105. An intake air temperature (TA) sensor 108, which is located downstream of the sensor 107, detects an intake air temperature TA, and outputs a corresponding electric signal to the ECU 105.

An engine water temperature (TW) sensor 109, which is mounted on the main body of the engine 101, is constituted by a thermister. The sensor 10 detects an engine water temperature (cooling water temperature) TW and outputs a corresponding electric signal to the ECU 105.

An engine revolution (NE) sensor 110 and a cylinder identification (CYL) sensor 111 are provided on the peripheries of the cam shaft and the crank shaft (not shown) of the engine 101. Concerning the top dead center point (TDC), when each cylinder of the engine 101 begins its intake stroke, the engine revolution sensor 110 outputs a TDC signal pulse at a crank angle (each crank angle of 180° for the four-cylinder engine) that is smaller than a predetermined crank angle. The cylinder identification sensor 111 outputs a cylinder identification signal pulse at a predetermined crank angle for a specific cylinder, and each signal pulse is transmitted to the ECU 105.

An ignition plug 113, which is provided for each cylinder of the engine 101, is connected to the ECU 105. Its operation is controlled by the ECU 105.

A three-way catalyst 115 and a NOx purifying device 116, which is an nitrogen oxide purifying means, are positioned, in the named order, upstream along an exhaust pipe 112. The three-way catalyst 115 has an oxygen storage capacity. And when the air-fuel ratio of a mixture to be supplied to the engine 101 is set in the vicinity of the stoichiometric air-fuel ratio, the three-way catalyst 115 efficiently oxidizes the HC and the CO contained in the exhaust gases, and reduces NOx.

The NOx purifying device 116 incorporates a NOx absorbent for absorbing NOx, and a catalyst for promoting oxidization and reduction. The NOx absorbent can be an occlusion type or an adsorption type. The first absorbent type absorbs the NOx in a lean exhaust-gas condition wherein the air-fuel ratio of the air mixture to be supplied to the engine 101 is set leaner than the stoichiometric air-fuel ratio, and wherein the oxygen concentration in the exhaust gas is comparatively high (much NOx is contained), while the absorbent discharges NOx that has been absorbed in a rich exhaust-gas condition, wherein the air-fuel ratio of the mixture to be supplied to the engine 101 is set so that it equals or exceeds the stoichiometric air-fuel ratio and wherein the oxygen concentration in the exhaust gas is comparatively low. The second absorbent absorbs NOx in the lean exhaust-gas condition, and reduces NOx in the rich exhaust-gas condition. The NOx purifying device 116 is so designed that in a lean exhaust-gas condition the NOx absorbent absorbs NOx, and in a rich exhaust-gas condition the NOx absorbent releases NOx that is reduced by HC and CO and is discharged as a nitrogen gas, while concurrently the CO is oxidized and is discharged as steam and dioxide. Ballium oxide (BaO), for example, is used as a NOx absorbent of an occlusion type, while sodium (Na) and titanium (Ti), or strontium (Sr) and titanium (Ti), are employed as a NOx absorbent of an adsorption type. A noble metal, such as rhodium (Rh), palladium (Pd) or Platinum (Pt), is employed as a catalyst for the occlusion type or for the adsorption type.

In a specific engine operating state, the NOx purifying device 116, which incorporates the NOx absorbent, executes control of the short-interval air-fuel ratio variation process, which will be described later, whereby the air-fuel ratio of an air-fuel mixture to be supplied to the engine 101 is varied within a comparatively short time interval. Therefore, the NOx can be efficiently reduced, merely by using the catalyst, without the NOx being absorbed by the NOx absorbent, and the elevation of the temperature of the NOx absorbent can be accelerated.

When the absorption of NOx continues until the absorption capacity limit of the NOx absorbent, i.e., the maximum NOx absorption volume, is reached and no further NOx can be absorbed, as needed, a rich air-fuel ratio is set, i.e., a reduction, rich operation is performed, in order to discharge the NOx for reduction. Further, when the volume of SOx absorbed by the NOx absorbent has increased, the operating mode is shifted to a recovery process mode for a deteriorated NOx absorbent. In this mode, the short-interval air-fuel ratio variation processing is performed to elevate the temperature of the NOx absorbent, and subsequently, the SOx removing process is initiated.

A linear air-fuel ratio sensor (hereinafter referred to as an "LAF sensor") 114 is arranged upstream of the NOx purifying device 116. The LAF sensor 114 outputs to the ECU 105 an electric signal that is substantially proportional to the oxygen concentration (air-fuel ratio) of the exhaust gases.

Further, the ECU 105, which is mounted on the engine 101, is connected to a speed sensor 125, which serves as speed detection means for detecting the running speed (car speed) VCAR of a vehicle that is driven by the engine 101 and which transmits a detection signal to the ECU 105.

An exhaust gas reflux path 121 is provided between the downstream side of the throttle valve 103 of the air intake pipe 102 and the upstream side of the three-way catalyst 115 on the exhaust pipe 112. An exhaust gas reflux valve (hereinafter referred to as an "EGR valve") 122 is provided along the route of the exhaust gas reflux path 121 and controls the air flow rate of an exhaust gas reflux. The EGR valve 122 is a solenoid-controlled solenoid valve, the valve travel of which is controlled by the ECU 105. Provided for the EGR valve 122 is a lift sensor 123 that detects the valve travel (valve lift distance) LACT and that transmits a detection signal to the ECU 105.

The ECU 105 determines the engine operating state based on various engine parameter signals, and transmits a control signal to the solenoid of the EGR valve 122, in order to set to zero a deviation between the instructed valve travel value (valve travel control value) LCMD, for the EGR valve 122, and the actual valve travel LACT, which is detected by the lift sensor 123.

The engine 101 has a valve timing switch mechanism 130 that can alternately set the valve timings for the air intake valve and the air exhaust valve at two levels: a quick valve timing that is appropriate for a rapidly rotating region of the engine, and a slow valve timing that is appropriate for a slowly rotating region. The switching of the valve timing includes the switching of the distance lifted by the valves. And further, when the slow valve timing is selected, one of the two valves is halted in order to ensure stable combustion, even when the air-fuel ratio is lower than the stoichiometric air-fuel ratio.

The valve timing switch mechanism 130 employs hydraulic pressure to switch the valve timing. A solenoid-controlled valve and a hydraulic sensor for this switching are connected to the ECU 105. The detection signal emitted by the hydraulic sensor is transmitted to the ECU 105, which then controls the solenoid-controlled valve when switching to a valve timing that is consonant with the operating state of the engine 101.

The ECU 105 includes: an input circuit 105a, which has functions for shaping the waveform of a signal received from each sensor, for correcting and setting the voltage at a predetermined level, and for converting an analog signal value into a digital signal value; a central processing unit (hereinafter referred to as a "CPU") 105b; storage unit 105c, for storing various operating programs that are executed by the CPU 105b, a table and a map used for the programs, and the results that are obtained by the CPU 105b; and an output circuit 105d, for transmitting a drive signal to the fuel injection valve 106, the ignition plug 113 and the EGR valve 122.

Based on the above described engine parameter signals, the CPU 105b determines the existence of various engine operating states, and in accordance with a determined engine operating state, employs equation (1) to calculate a fuel injection time TOUT for the fuel injection valve 106, which is opened in synchronization with the TDC signal pulse.

$$TOUT = TI \times KCMD \times KLAF \times K1 + K2, \ldots \quad (1)$$

In this equation, TI denotes the basic fuel injection time for the fuel injection valve 106, and is determined by searching the TI map that is set in accordance with engine revolutions NE and absolute air-intake-pipe internal pressure PBA. The TI map is so set that the air-fuel ratio of a mixture to be supplied to an engine is substantially equal to the stoichiometric air-fuel ratio in an operating state that corresponds to the engine revolutions NE and the absolute air-intake-pipe internal pressure PBA.

KCMD denotes a target air-fuel ratio coefficient, and is set in accordance with engine parameters, such as the engine revolutions NE, the absolute air-intake-pipe internal pressure PBA and the engine water temperature TW. Since the target air-fuel coefficient KCMD is proportional to the reciprocal of air-fuel ratio A/F, i.e., air-fuel ratio F/A, and has a value of 1.0 at the stoichiometric air-fuel ratio, the coefficient KCMD is also called a target equivalence ratio.

KLAF denotes an air-fuel ratio compensation coefficient that is calculated under PID control, so that the equivalence ratio KACT, which is obtained from a detection value provided by the LAF sensor 114, matches the target equivalence ratio KCMD.

K1 and K2 denote another compensation coefficient and a compensation variable that are obtained in accordance with various engine parameter signals, and that are determined to be preset values, so that various characteristics, such as the fuel characteristics and engine acceleration characteristics, that are consonant with the engine operating state are optimized.

The CPU 105b also calculates the ignition timing IG using equation (2) in accordance with the engine operating state. The ignition timing IG is obtained as a distance advanced from top dead center.

$$IG = IGMAP + IGCR \quad (2).$$

IGMAP denotes the basic ignition timing that is determined by using the IG map that is set in accordance with the engine revolution NE and the absolute air-intake-pipe internal pressure PBA. IGCR denotes a correction term that is set in accordance with the engine operating state.

Based on the thus obtained fuel injection time TOUT, the CPU 105b transmits a drive signal, for opening the fuel injection valve 106, to the fuel injection valve 106 via the output circuit 105d, and transmits, to the ignition plug 113, an ignition signal for driving the ignition plug 113 at the ignition timing IG.

Figure 22:
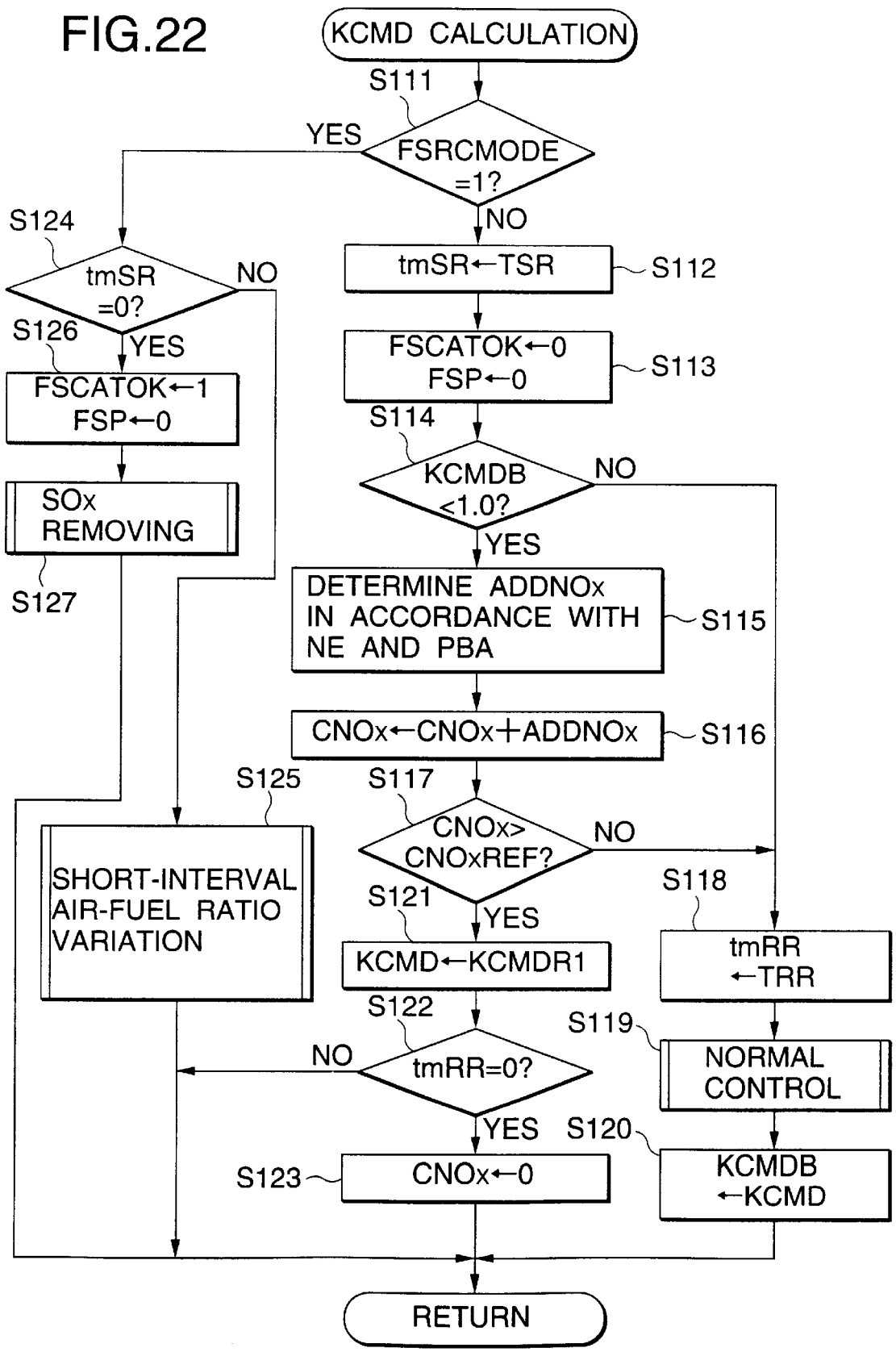
FIG. 22 is a flowchart showing the processing performed to calculate a target air-fuel ratio (KCMD)

FIG. 22 is a flowchart showing the processing performed to calculate the target air-fuel ratio coefficient KCMD used in equation (1). This processing is performed by the CPU 5b every constant time.

At step S111, a check is performed to determine whether a deterioration recovery mode flag FSRCMODE, which is set during the performance of a process in FIG. 23 and which will be described later, is "1," which represents a mode in which a recovery process is performed for a NOx absorbent that has been deteriorated. When FSRCMODE=0, a predetermined temperature elevation time TSR (e.g., 60 seconds) is set for a count-down timer tmSR, which counts the time for the execution of the short-interval air-fuel ratio variation control at step S125, and the count-down timer tmSR is started (step S112). Further, both a SOx removing execute flag FSCTOK, which when set to "1" indicates that a SOx removing process is being performed, and an air-fuel ratio variation flag FSP, which when set to "1" indicates that the short-interval air-fuel ratio variation control is being performed, are set to "0" (step S113). Program control thereafter advances to step S114.

At step S114, a check is performed to determine whether a lean operation is being executed, i.e., whether the value KCMDB of the target air-fuel ratio coefficient KCMD, which is stored under normal control at step S120 and which will be described later, is smaller than 1.0. When KCMDB is equal to or greater than 1.0 and a lean operation is not currently being performed, program control goes to step S118, and the time TRR (e.g., one to two seconds) for the reduction, rich operation is set for a count-down timer tmRR, which will be referred to later at step S122, and the timer is started. Following this, the target air-fuel ratio coefficient KCMD is set under normal control, i.e., in accordance with the engine operating state (step S19). The target air-fuel ratio coefficient KCMD is basically calculated using the engine revolutions NE and the absolute air-intake-pipe internal pressure PBA, and is changed to a value in accordance with the operating state when the engine water temperature TW is low, or when a predetermined high load is imposed. The target air-fuel ratio coefficient KCMD obtained at step S19 is stored as the value KCMDB (step S120), and the processing is thereafter terminated.

When, at step S114, the target air-fuel ratio coefficient KCMDB is smaller than 1.0 and a lean operation is being performed, an increase value ADDNOx, which is used at step S116, is determined in accordance with the engine revolutions NE and the absolute air-intake-pipe internal pressure PBA (step S115). The increase value ADDNOx is a parameter that corresponds to the volume of the NOx that is output in the exhaust each unit hour during a lean operation. The value ADDNOx is increased in accordance with increases in the engine revolutions NE and the absolute air-intake-pipe internal pressure PBA.

At step S116, the increase value ADDNOx, which is determined at step S115, is employed to increment the NOx counter CNOx. As a result, a count value is obtained that corresponds to the volume of the NOx that is output in the exhaust, i.e., the volume of the NOx that is absorbed by the NOx absorbent.

$$CNOx=CNOx+ADDNOx$$

At step S117, a check is performed to determine whether the value of the NOx counter CNOx exceeds a permissible value CNOxREF. When the count value does not exceed the permissible value CNOxREF (NO), program control advances to step S118 and the target air-fuel ratio coefficient KCMD is set under normal control conditions, i.e., the engine operating state. The permissible value CNOxREF is set to a value corresponding to a NOx volume that is slightly smaller than the maximum NOx absorption capacity of the NOx absorbent, or with an allowance, is set to a value that corresponds to ½ the maximum NOx absorption capacity.

When, at step S117, the value of the counter CNOx exceeds the permissible value CNOxREF, the target air-fuel ratio coefficient KCMD is set to a predetermined rich value KCMDR1 that corresponds to an air-fuel ratio of 14.0, and a reduction, rich operation is executed (step S121). A check is then performed to determine whether the value of the timer tmRR is "0" (step S22). When the value of the timer tmRR is greater than "0," the processing is immediately terminated, but when tmRR equals "0," the value held by the NOx counter CNOx is reset (step S123). Thus, since from that time on the decision at step S117 will be negative (NO), control of the operation is shifted to normal.

When, at step S111, FSRCMODE=1, a check is performed to determine whether the value of the timer tmSR is "0" (step S124). When tmSR>0, program control advances to step S125 and the short-interval air-fuel ratio variation control process is performed. When tmSR=0, it is assumed that the temperature TCAT at the catalyst has increased until it is sufficiently elevated for the performance of the SOx removing process. Then, the SOx removing execution flag FSCATOK is set to "1" and the air-fuel ratio variation flag FSP is reset (step S126). Thereafter, the SOx removing process is performed (step S127).

In the processing in FIG. 22, a continuous lean operation time in the lean operation enabled state, i.e., the time required for the value of the NOx counter CNOx to move from 0 to the permissible value CNOxREF, is varied in accordance with the engine operating state, but is about 8 to 30 seconds. Therefore, when the operating mode is not the deterioration recovery mode for the purifying of the SOx that has been absorbed by the NOx absorbent (FSRCMODE=0), and when the lean operation can be used, the air-fuel ratio variation control process is performed to set the continuous lean operation time to 3 to 30 seconds, and to set the reduction, rich operation time (=TRR) to 1 to 2 seconds (steps S114 to S123). When the deterioration reproduction mode flag FSRCMODE is set to "1" and the operating mode is shifted to the deterioration recovery mode, first, the air-fuel variation interval at which the air-fuel ratio variation control process is performed is shortened (step S125). Then, when the temperature of the NOx absorbent is increased until it is sufficiently elevated for the performance of the SOx removing process, the SOx removing process (step S127) is begun.

Figure 23:
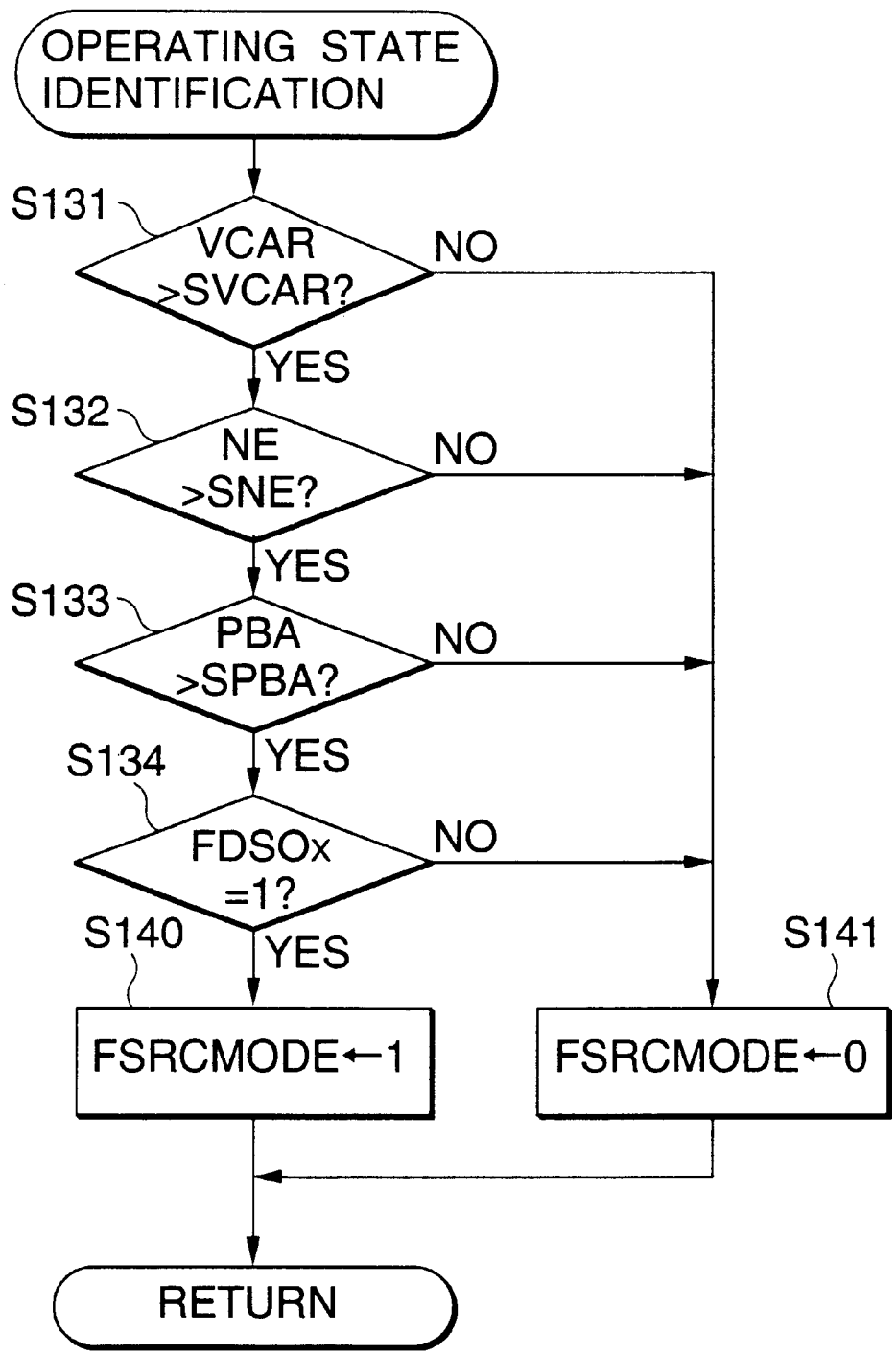
FIG. 23 is a flowchart showing the processing performed to identify an operating state for SOx removing.

FIG. 23 is a flowchart showing the operating state identification processing for setting the deterioration recovery mode flag FSRCMODE that is examined at step S111 in FIG. 22. This processing is executed by the CPU 105b each constant time.

First, a check is performed to determine whether the speed VCAR is higher than a predetermined speed SVCAR (e.g., 60 km/h) (step S131). When VCAR>SVCAR, a check is performed to determine whether the engine revolutions NE are greater than predetermined revolutions SNE (e.g., 1800 rpm) (step S132). When NE>SNE, a check is performed to determine whether the absolute air-intake-pipe internal pressure PBA is higher than predetermined pressure SPBA (e.g., 360 mmHg) (step S133). When the decision at one of steps S131 to S133 is negative (NO), the deterioration recovery mode flag FCRCMODE is set to "0" (step S141). The processing is thereafter terminated.

Figure 24:
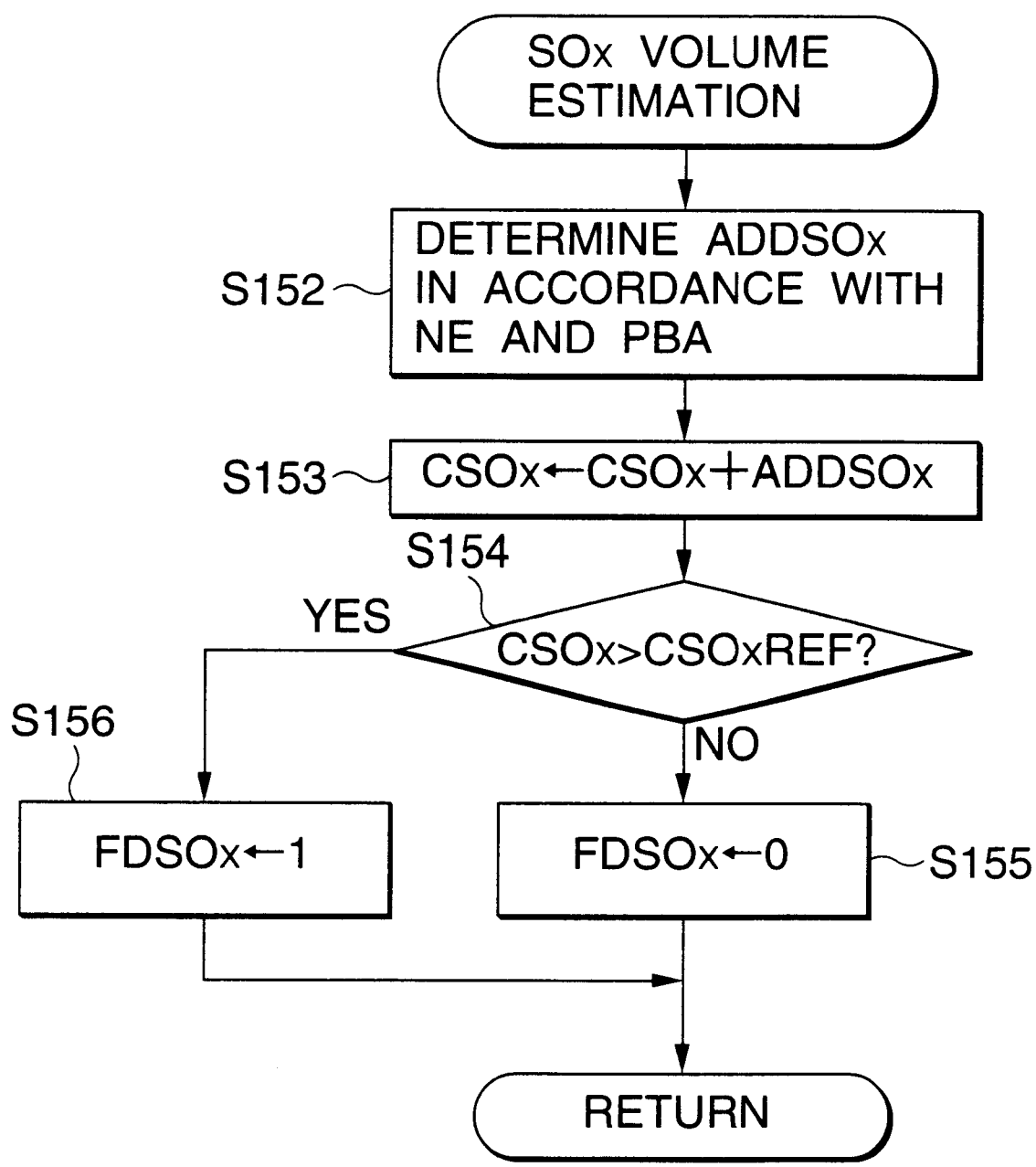
FIG. 24 is a flowchart showing the processing performed to estimate the volume of the SOx that is absorbed by a NOx absorbent.

When the decisions at all steps S131 to S133 are affirmative (YES), a check is performed to determine whether the deterioration flag FDSOx is set to "1," which indicates that the SOx volume, which is estimated in a process in FIG. 24 and that is absorbed by the NOx absorbent of the Nox purifying device 116, has exceeded a permissible value, i.e., that deterioration of the NOx purifying device 116 has occurred (step S134). When FDSOx=0 and the SOx volume does not exceed the permissible value, program control shifts to step S141. When FDSOx=1 and deterioration of the NOx purifying device 116 has occurred, the deterioration reproduction mode flag FSRCMODE is set to "1" (step S140). The processing is thereafter terminated.

FIG. 24 is a flowchart showing the processing for estimating volume of the SOx that has been absorbed by the NOx absorbent of the NOx purifying device 116. This processing is performed by the CPU 105b every constant time.

First, an increase value ADDSOx, which is used at step S153, is determined in accordance with the engine revolutions NE and the absolute air-intake-pipe internal pressure PBA (step S152). The increase value ADDSOx is a parameter that corresponds to the volume of the SOx that is discharged each unit hour during a lean operation. The value ADDSOx is increased in accordance with increases in the engine revolutions NE and the absolute air-intake-pipe internal pressure PBA. Since the volume of the SOx that is discharged each unit hour is considerably smaller than the volume of the NOx in the exhaust, the increase value ADDSOx is smaller than the increase value ADDNOx, which corresponds to the volume of the NOx in the exhaust.

At step S153, the increase value ADDSOx, which is determined at step S152, is employed to increment the SOx counter CSOx. As a result, the count value that corresponds to the exhausted SOx volume, i.e., the volume of the SOx that is absorbed by the NOx absorbent, is obtained.

$$CSOx=CSOx+ADDSOx$$

Following this, at step S154, a check is performed to determine whether the value of the SOx counter SCOX exceeds a permissible CSOxREF. When CSOx≦CSOxREF, the deterioration flag FDSOx is set to "0" (step S55). When CSOx>CSOxREF, the deterioration flag FDSOx is set to "1" (step S156). The permissible CSOxREF is set, for example, to a value that corresponds to a condition wherein the absorption capacity of the NOx absorbent is reduced to approximately ½ that of a brand new product.

In the processing in FIG. 24, the volume of the SOx that is absorbed by the NOx absorbent is determined, and when the volume of the SOx exceeds the permissible value, the deterioration flag FDSOx is set to "1." As a result, when the decisions at steps S131 to S133 in FIG. 23 are affirmative (YES), the deterioration recovery mode flag FSRCMODE is set to "1" (step S140). Then, the short-interval air-fuel ratio variation process (step S125 in FIG. 22) and the SOx removing process (step S127 in FIG. 22) are performed.

Figure 25:
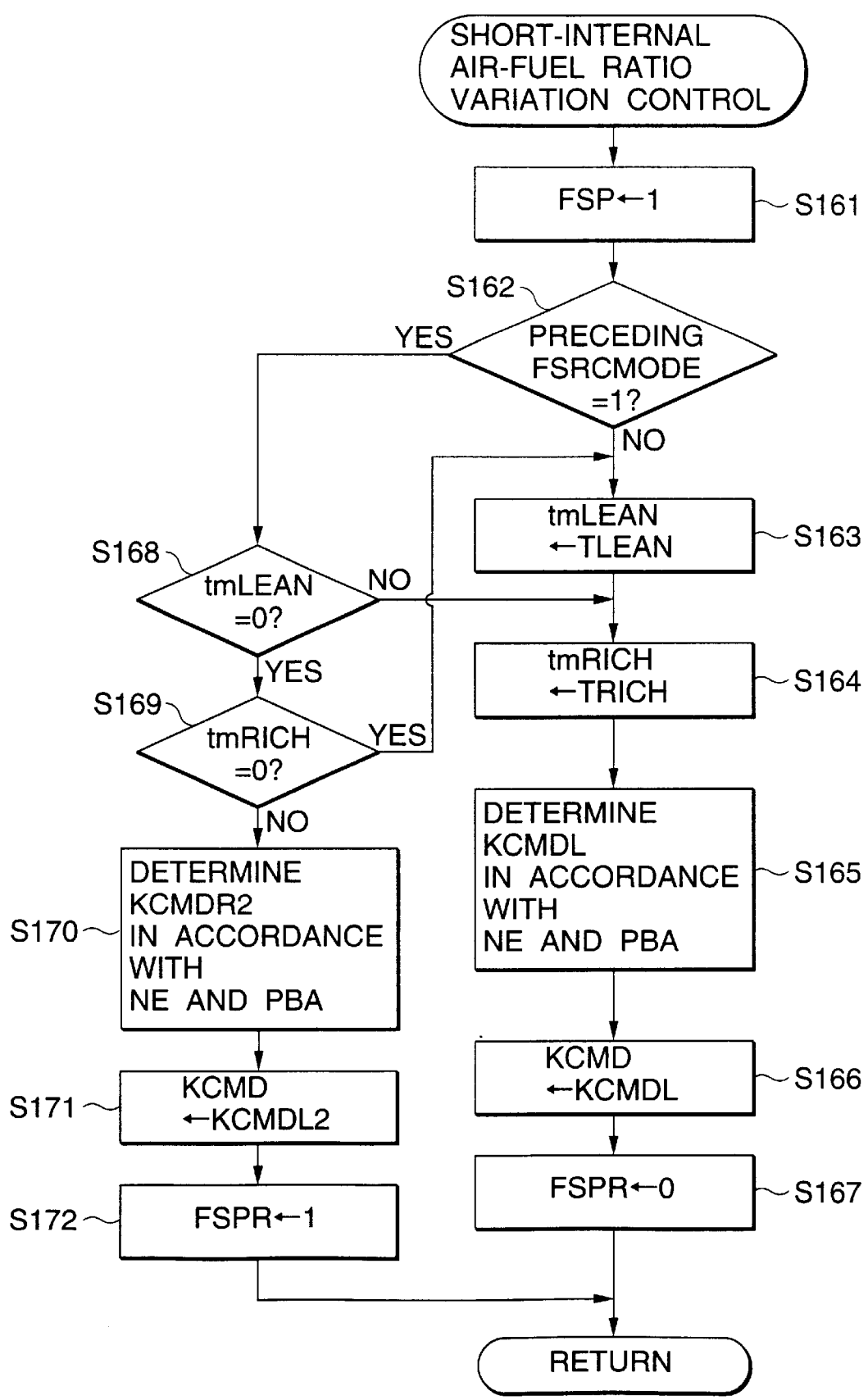
FIG. 25 is a flowchart showing the processing performed to execute short-interval air-fuel ratio variation control.

FIG. 25 is a flowchart showing the short-interval air-fuel ratio variation control executed at step S125 in FIG. 22.

At step S161, the air-fuel ratio variation flag FSP is set to "1," and then a check is performed to determine whether the deterioration recovery mode flag FSRCMODE was set to "1" at the time the preceding process was performed in FIG. 22 (step S262). When the preceding FSRCMODE=0, a lean time TLEAN (e.g., 0.3 seconds) is set for a count-down timer tmLEAN that counts the continuous lean operation time, and the count-down timer tmLEAN is started (step S163). Then, a rich time TRICH (e.g., 0.3 seconds) is set for to a count-down timer tmRICH that counts the continuous rich operation time, and the count-down timer tmRICH is started (step S164). Following this, a predetermined lean value KCMDL is determined in accordance with the engine revolutions NE and the absolute air-intake-pipe internal pressure PBA (step S165). The target air-fuel ratio coefficient KCMD is set for the predetermined lean value KCMDL (step S166), which is determined at step S165, that employs, as the center value, a value that corresponds to an air-fuel ratio of 20, for example. At step S167, the rich operation flag FSPR, which when set to "1" indicates that a rich operation is being performed, is set to "0" and the processing is thereafter terminated.

Since, following this the decision at step S162 is affirmative (YES), program control advances to step S168, whereat a check is performed to determine whether the value of the timer tmLEAN is "0." Since initially tmLEAN>0, program control shifts to step S164, and the lean operation is continued. When tmLEAN=0 at step S168, at step S169 a check is performed to determine whether the value of the timer tmRICH is "0." Since initially tmRICH>0, a predetermined rich value KCMDR2 is determined in accordance with the engine revolutions NE and the absolute air-intake-pipe internal pressure PBA (step S170). The target air-fuel ratio KCMD is set to the predetermined rich value KCMDR2 that is determined at step S170 (step S171), and the predetermined rich value KCMDR2 employs, as the center value, a value that corresponds to an air-fuel ratio of 11, for example. At step S172, the rich operation flag FSPR, which when set to "1" indicates that a rich operation is being performed, is set to "1" and the processing is thereafter terminated.

Figure 26:
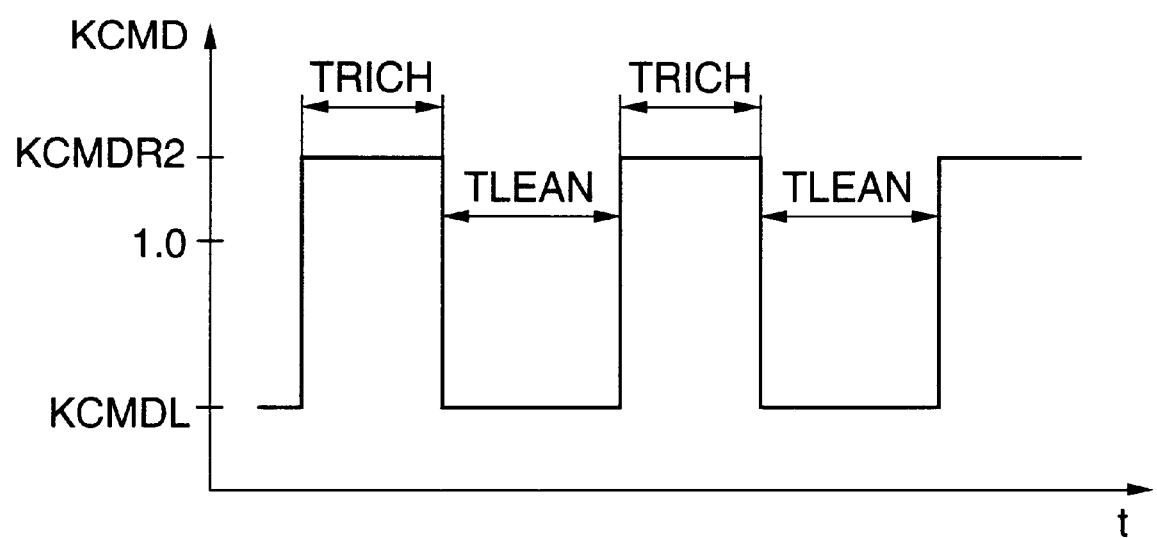
FIG. 26 is a time chart for explaining the processing performed in FIG. 25.

Through the processing in FIG. 25, the short-interval air-fuel ratio variation control process is performed, as is shown in FIG. 26, whereby the lean operation for the lean time TLEAN and the rich operation for the rich time TRICH are repeated.

Figure 27:
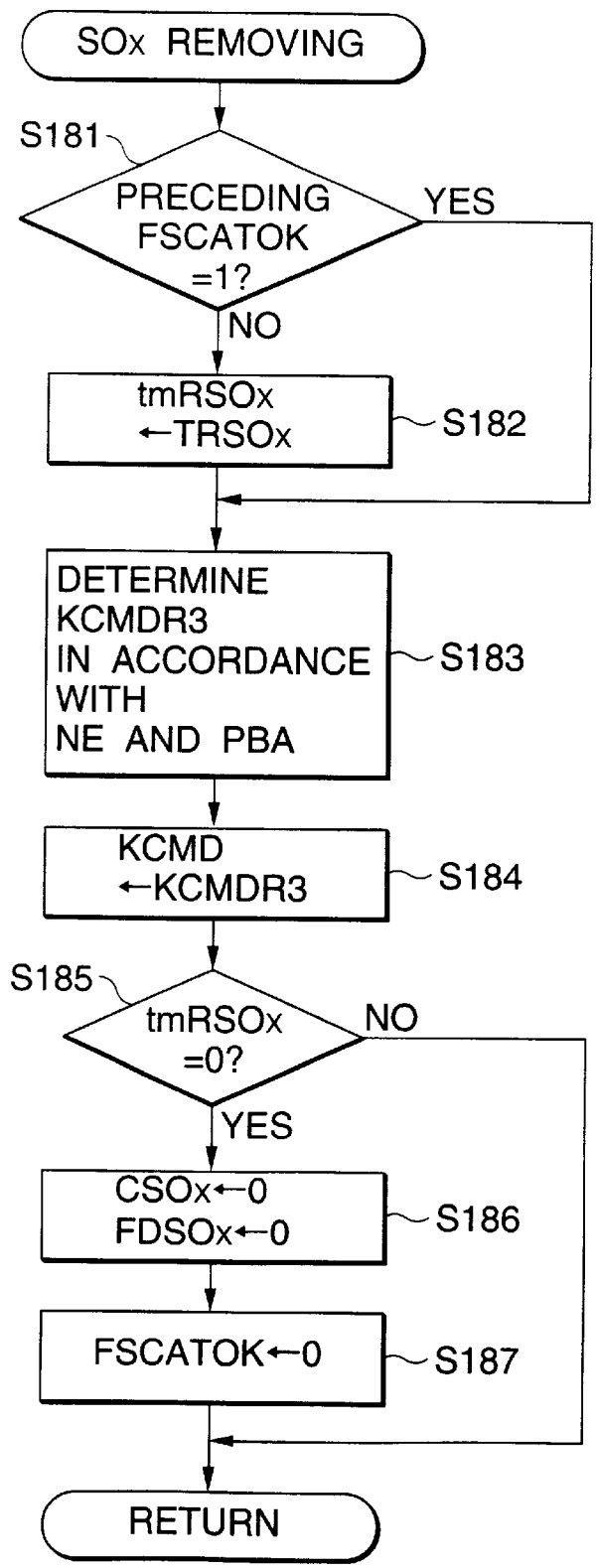
FIG. 27 is a flowchart showing the processing performed to remove the SOx that has been absorbed by the NOx absorbent.

FIG. 27 is a flowchart showing the SOx removing processing performed at step S124 in FIG. 22.

At step S181, a check is performed to determine whether a SOx removing execution flag FSCATOK was set to "1" the preceding time during the processing in FIG. 22. When FSCATOK=0, ie., when the state FSCATOK=0 is shifted to the state FSCATOK=1, a deterioration recovery time TRSOx (e.g., 8 minutes) is set for a count-down timer tmRSOx that counts the continuous rich operation time for the SOx removing process (step S182). Program control then advances to step S183. The next time through the processing, program control jumps from step S181 to step S183.

At step S183, predetermined SOx reduction rich value KCMDR3 is determined in accordance with the engine revolutions NE and the absolute air-intake-pipe internal pressure PBA, and the target air-fuel ratio coefficient KCMD is set to the predetermined SOx reduction rich value KCMDR3 (step S184). The predetermined SOx reduction rich value KCMDR3 employs, as the center value, a value that corresponds to an air-fuel ratio of 11, for example. At step S85, a check is performed to determine whether the value of the time tmRSOx is "0." When tmRSOx>0, the processing is terminated. When tmRSOx=0, the SOx counter CSOx is reset and the deterioration flag FDSOx is set to "0" (step S186), as is the SOx removing execution flag FSCATOK (step S187), and the processing is thereafter terminated. Then, when the process at step S186 is performed, the deterioration reproduction mode flag FRSCMODE is set to "0" again (steps S134 and S141 in FIG. 23), and the SOx removing processing is terminated.

Figure 28:
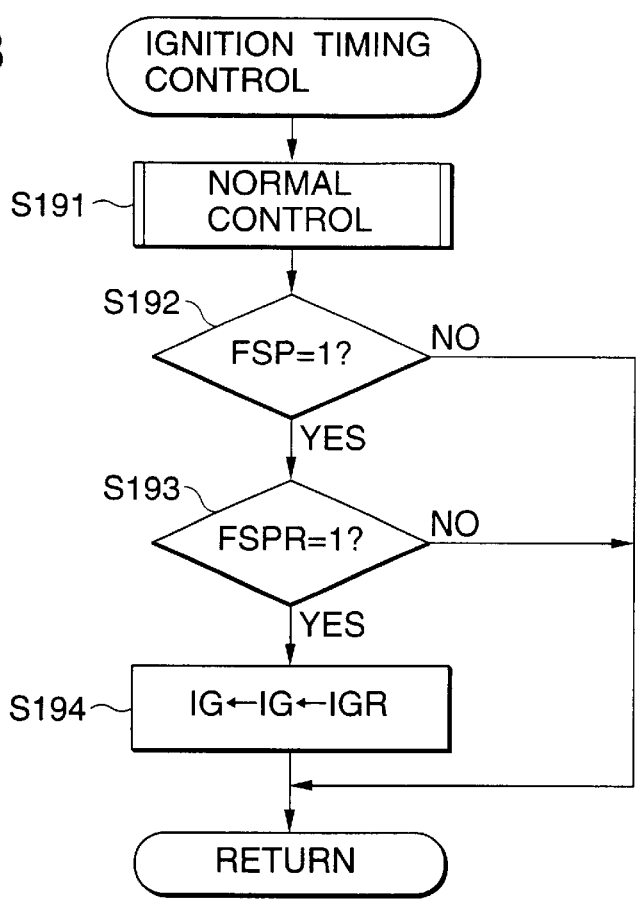
FIG. 28 is a flowchart showing the processing performed to control the ignition timing.

FIG. 28 is a flowchart showing the processing for calculating the ignition timing IG. This processing is performed by the CPU 105b each constant time, or in synchronization with the generation of a TDC signal pulse.

At step S191, normal control is executed. That is, the basic ignition timing IGMAP is calculated so that it is in accordance with the engine revolutions NE and the absolute air-intake-pipe internal pressure PBA, the correction term IGCR is calculated so that it is in accordance with the engine operating state, and the ignition timing IG is obtained using equation (2). A check is then performed to determine whether the air-fuel ratio variation flag FSP is set to "1" (step S192). When FSP=0, and the short-internal air-fuel ratio variation control is not executed, the processing is immediately terminated.

When FSP=1 and the short-interval air-fuel ratio variation control is executed, a check is performed to determine whether the rich operation flag FSPR is set to "1" (step S193). When FSPR=1, the ignition timing obtained at step S191 is delayed a period equivalent to the correction time IGR (step S194). When FSPR=0, the processing is immediately terminated, so that the ignition timing IG obtained at step S191 is employed unchanged.

Through the processing in FIG. 28, when the air-fuel ratio is set rich while the short-interval air-fuel ratio variation control is executed, the ignition timing IG is delayed, i.e., is so corrected that the engine output is reduced. When the air-fuel ratio is set lean, the ignition timing IG is advanced further than it is for a rich operation, so that the engine output is increased. Therefore, a variation in the engine output torque that is accompanied by an alteration of the air-fuel ratio can be suppressed by correcting the ignition timing IG, and the performance of a preferable operation can be maintained.

Figure 29:
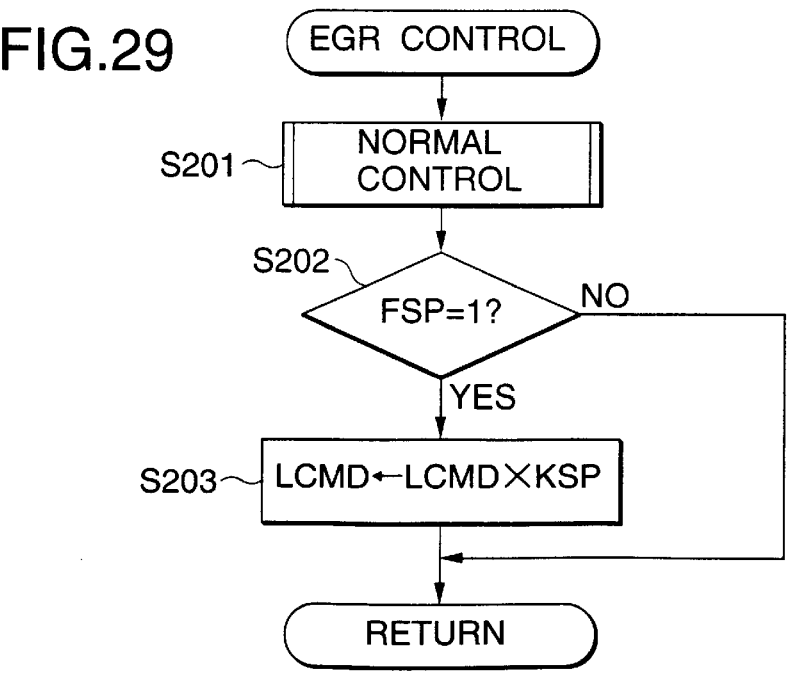
FIG. 29 is a flowchart showing the processing performed to control the volume of the exhaust reflux.

FIG. 29 is a flowchart showing the processing used for calculating the instructed valve travel value LCMD for the EGR valve 122. This processing is performed by the CPU 105b for every constant time, or in synchronization with the generation of a TDC signal pulse.

At step S201, normal control is executed. That is, an examination of the LCMDM map is performed in accordance with the engine revolutions NE and the absolute air-intake-pipe internal pressure PBA, and the map value LCMDM for the instructed valve travel value LCMD is calculated. The map value LCMDM is so set that, in accordance with the operating state of the map, the exhaust reflux volume matches the target exhaust reflux volume that is designated in advance.

Then, a check is performed to determine whether the air-fuel ratio variation flag FSP is set to "1" (step S202). When the flag FSP=0 and the short-interval air-fuel ratio variation control is not executed, the processing is immediately terminated. When the flag FSP=1 and the short-interval air-fuel ratio variation control is currently being executed, the instructed valve travel value LCMD obtained at step S201 is multiplied by the correction coefficient KSP, which is set to a value smaller than 1, so that the instructed valve travel value is reduced (step S203).

Through the processing in FIG. 29, during the short-interval air-fuel ratio variation control, the instructed valve travel value LCMD of the EGR valve 122 is corrected and is reduced. That is, since the exhaust reflux volume is reduced so that it is less than it is when normal control is executed, it is possible to reduce the adverse affects, such as a delay in the response of the EGR valve 122, that are caused by the short-interval air-fuel ratio variation, and to continue to perform a preferable operation. This process is performed while taking the following problem into account. Since the exhaust reflux volume (the valve travel of the EGR valve 122) is changed in accordance with the designated air-fuel ratio, when, during the execute of the short-interval air-fuel ratio variation control, the same exhaust ref lux volume as for normal control is set in accordance with the air-fuel ratio variation, a desired characteristic can not be obtained due to a delay in the response of the EGR valve 122, or a delay in the movement of a reflux gas. When the exhaust reflux volume is reduced, or when the exhaust ref lux is halted, adverse affects, such as a delay in the response of the EGR valve 122, can be suppressed.

Both a delay in the ignition timing and a reduction in the exhaust reflux volume serve to raise the temperature of the exhaust gas. Therefore, an increase in the temperature of the NOx absorbent is accelerated, and a preferable characteristic can be obtained for the temperature elevation.

The present invention is not limited to this embodiment, and can be variously modified. In the process in FIG. 29, during the execute of the short-internal air-fuel ratio variation control, the instructed valve travel value LCMD is reduced and the exhaust reflux operation is performed. However, when LCMD=0, the exhaust reflux may be halted.

The internal combustion engine is not limited to one that injects fuel into an air-intake pipe, but may also include one that injects fuel directly into the combustion chamber of each cylinder.

As is described above, according to the invention, when the short-interval air-fuel ratio variation is controlled, the exhaust reflux volume is reduced. Further, when the air-fuel ratio is set so that it is richer than the stoichiometric air-fuel ratio, the ignition timing is delayed, and when the air-fuel ratio is set so that it is leaner than the stoichiometric air-fuel ratio, the ignition timing is advanced. Thus, a change in the engine output torque, which occurs when the air-fuel ratio is altered by delaying or advancing the ignition timing, can be suppressed; adverse affects, such as a delay in the response of the exhaust reflux unit due to a reduction in the exhaust reflux volume, can be reduced; and a preferable operation can be maintained.

What is claimed is:

1. An exhaust gas purifying apparatus for the exhaust system of an internal combustion engine, comprising:

nitrogen oxide purifying means for absorbing the nitrogen oxide in exhaust gases in a lean exhaust-gas condition during which the oxygen concentration of the exhaust gas is comparatively high;

deterioration detection means for detecting the deterioration of the nitrogen oxide purifying means;

air-fuel ratio variation means for, when the deterioration of the nitrogen oxide purifying means is detected by the deterioration detection means, varying, during an interval that is set equal to or shorter than a predetermined time, the air-fuel ratio for the air-fuel mixture supplied to the internal combustion engine, and to thus provide an air-fuel ratio that is leaner or richer than a stoichiometric air-fuel ratio;

operating state identification means for determining whether one of the air-fuel ratio variation means and a contamination removal process is implemented, wherein the air-fuel ratio variation means does not occur if one of a speed of an apparatus containing the internal combustion engine, an engine revolution rate and an absolute air intake-pipe internal pressure, is not respectively higher than a predetermined amount; and deterioration recovery means for, when an elevated temperature attained at the nitrogen oxide purifying means exceeds a deterioration recovery temperature following activation of the air-fuel ratio variation means, performing deterioration recovery by maintaining for an adequate period of time a richer air-fuel ratio than the stoichiometric air-fuel ratio.

2. The exhaust gas purifying apparatus according to claim 1, wherein the predetermined time is an appropriate time period for effecting the elevation of the temperature of the nitrogen oxide purifying means.

3. The exhaust gas purifying apparatus according to claim 2, wherein the predetermined time is three seconds or less.

4. The exhaust gas purifying apparatus according to claim 3, wherein the predetermined time is (lean time+rich time), in which the lean time, for setting the air-fuel ratio leaner than the stoichiometric air-fuel ratio, is defined as a period of 2 seconds or less, and the rich time, for controlling the air-fuel ratio that is richer than the stoichiometric air-fuel ratio, is defined as ½ the lean time or shorter.

5. The exhaust gas purifying apparatus according to claim 3, further comprising a three-way catalyst positioned immediately downstream of the engine, wherein the nitrogen oxide purifying means is positioned downstream of the three-way catalyst, and substantially the same period is set for the lean time and the rich time.

6. The exhaust gas purifying apparatus according to claim 1, wherein, the deterioration recovery time is set in accordance with the volume of the SOx adsorbed in the nitrogen oxide purifying means at the time the deterioration is detected.

7. The exhaust gas purifying apparatus according to claim 6, wherein the deterioration recovery time is set to be a time required for the reduction of substantially all the adsorbed SOx.

8. An exhaust gas purifying apparatus for the exhaust system of an internal combustion engine, comprising:
- nitrogen oxide purifying means for absorbing nitrogen oxide contained in exhaust gases in a lean exhaust-gas condition in which the oxygen concentration of the exhaust gases is comparatively high;
- deterioration detection means for determining whether deterioration of the nitrogen oxide purifying means has occurred;
- air-fuel ratio variation means, in a specific operating state during which the exhaust gas airflow rate for the internal combustion engine is high, for varying the air-fuel ratio of an air-fuel mixture supplied to the internal combustion engine that is alternately leaner and richer than the stoichiometric air-fuel ratio, at a set time interval which is equal to or shorter than a predetermined time; and
- deterioration recovery means, for, when the temperature of the nitrogen oxide purifying means exceeds a deterioration recovery temperature, maintaining an air-fuel ratio that is richer than the stoichiometric air-fuel ratio for a period of time in accordance with the deterioration recovery processing required for the degree of deterioration detected.

9. The exhaust gas purifying apparatus according to claim 8, wherein the specific operating state is an operating state during which a rotational speed of the engine exceeds a predetermined rotational speed, and an absolute air-intake pipe internal pressure is greater than a predetermined pressure.

10. The exhaust gas purifying apparatus according to claim 8, wherein the predetermined time is an appropriate time period for effecting the elevation of the temperature of the nitrogen oxide purifying means.

11. The exhaust gas purifying apparatus according to claim 10, wherein the predetermined time is three seconds or less.

12. The exhaust gas purifying apparatus according to claim 11, wherein the predetermined time is (lean time+rich time), in which the lean time, for setting the air-fuel ratio richer than the stoichiometric air-fuel ratio, is defined as a period of 2 seconds or less, and the rich time, for controlling the air-fuel ratio that is richer than the stoichiometric air-fuel ratio, is defined as ½ the lean time or shorter.

13. The exhaust gas purifying apparatus according to claim 11, further comprising a three-way catalyst positioned immediately downstream of the engine, wherein the nitrogen oxide purifying means is positioned downstream of the three-way catalyst, and substantially the same period is set for the lean time and the rich time.

14. The exhaust gas purifying apparatus according to claim 8, wherein, the deterioration recovery time is set in accordance with the volume of the SOx accumulated in the nitrogen oxide purifying means at the time the deterioration is detected.

15. The exhaust gas purifying apparatus according to claim 9, wherein the deterioration recovery time is set to be a time required for the reduction of substantially all the adsorbed SOx.

16. An exhaust gas purifying apparatus for the exhaust system of an internal combustion engine, comprising:
- nitrogen oxide purifying means for absorbing the nitrogen oxide in exhaust gases in a lean exhaust-gas condition during which the oxygen concentration of the exhaust gas is comparatively high;
- deterioration detection means for detecting the deterioration of the nitrogen oxide purifying means;
- air-fuel ratio variation means for, when the deterioration of the nitrogen oxide purifying means is detected by the deterioration detection means, varying, during an interval that is set equal to or shorter than a predetermined time, the air-fuel ratio for the air-fuel mixture supplied to the internal combustion engine, and to thus provide an air-fuel ratio that is alternatively leaner or richer than a stoichiometric air-fuel ratio;
- deterioration recovery means for, when an elevated temperature attained at the nitrogen oxide purifying means exceeds a deterioration recovery temperature following activation of the air-fuel ratio variation means, performing deterioration recovery by maintaining for an adequate period of time a richer air-fuel ratio than the stoichiometric air-fuel ratio;
- a controller for the internal combustion engine;
- exhaust reflux means for returning exhaust gases to an intake system;
- exhaust reflux control means for, during the operation of the air-fuel ratio variation means, reducing the volume of the exhaust gases that are returned by the exhaust reflux means; and
- ignition timing control means for delaying ignition timing when the air-fuel ratio that is set by the air-fuel ratio variation means is richer, and for advancing the ignition timing when the air-fuel ratio that is set by the air-fuel ratio variation means is leaner.

17. The exhaust gas purifying apparatus according to claim 16, wherein the predetermined time is an appropriate time period for effecting the elevation of the temperature of the nitrogen oxide purifying means.

18. The exhaust gas purifying apparatus according to claim 17, wherein the predetermined time is three seconds or less.

19. The exhaust gas purifying apparatus according to claim 18, wherein the predetermined time is (lean time+rich time), in which the lean time, for setting the air-fuel ratio leaner than the stoichiometric air-fuel ratio, is defined as a period of 2 seconds or less, and the rich time, for controlling the air-fuel ratio that is richer than the stoichiometric air-fuel ratio, is defined as ½ the lean time or shorter.

20. The exhaust gas purifying apparatus according to claim 18, further comprising a three-way catalyst positioned immediately downstream of the engine, wherein the nitrogen oxide purifying means is positioned downstream of the three-way catalyst, and substantially the same period is set for the lean time and the rich time.

21. The exhaust gas purifying apparatus according to claim 16, wherein the deterioration recovery time is set in accordance with the volume of the SOx adsorbed in the nitrogen oxide purifying means at the time the deterioration is detected.

22. The exhaust gas purifying apparatus according to claim 21, wherein the deterioration recovery time is set to be a time required for the reduction of substantially all the adsorbed SOx.

23. An exhaust gas purifying apparatus for the exhaust system of an internal combustion engine, comprising:
- nitrogen oxide purifying means for absorbing nitrogen oxide contained in exhaust gases in a lean exhaust-gas condition in which the oxygen concentration of the exhaust gases is comparatively high;
- deterioration detection means for determining whether deterioration of the nitrogen oxide purifying means has occurred;
- air-fuel ratio variation means, in a specific operating state during which the exhaust gas airflow rate for the internal combustion engine is high, for varying the air-fuel ratio of an air-fuel mixture supplied to the internal combustion engine that is alternately leaner and richer than the stoichiometric air-fuel ratio, at a set time interval which is equal to or shorter than a predetermined time;

deterioration recovery means, for when the temperature of the nitrogen oxide purifying means exceeds a deterioration recovery temperature, maintaining an air-fuel ratio that is richer than the stoichiometric air-fuel ratio for a period of time in accordance with the deterioration recovery processing required for the degree of deterioration detected;

a controller for the internal combustion engine;

exhaust reflux means for returning exhaust gases to an intake system;

exhaust reflux control means for, during the operation of the air-fuel ratio variation means, reducing the volume of the exhaust gases that are returned by the exhaust reflux means; and ignition timing control means for delaying ignition timing when the air-fuel ratio that is set by the air-fuel ratio variation means is richer, and for advancing the ignition timing when the air-fuel ratio that is set by the air-fuel ratio variation means is leaner.

24. The exhaust gas purifying apparatus according to claim 23, wherein the specific operating state is an operating state during which a rotational speed of the engine exceeds a predetermined rotational speed, and an absolute air-intake pipe internal pressure is greater than a predetermined pressure.

25. The exhaust gas purifying apparatus according to claim 23, wherein the predetermined time is an appropriate time period for effecting the elevation of the temperature of the nitrogen oxide purifying means.

26. The exhaust gas purifying apparatus according to claim 25, wherein the predetermined time is three seconds or less.

27. The exhaust gas purifying apparatus according to claim 26, wherein the predetermined time is (lean time+rich time), in which the lean time, for setting the air-fuel ratio richer than the stoichiometric air-fuel ratio, is defined as a period of 2 seconds or less, and the rich time, for controlling the air-fuel ratio that is richer than the stoichiometric air-fuel ratio, is defined as ½ the lean time or shorter.

28. The exhaust gas purifying apparatus according to claim 26, further comprising a three-way catalyst positioned immediately downstream of the engine, wherein the nitrogen oxide purifying means is positioned downstream of the three-way catalyst, and substantially the same period is set for the lean time and the rich time.

29. The exhaust gas purifying apparatus according to claim 23, wherein the deterioration recovery time is set in accordance with the volume of the SOx accumulated in the nitrogen oxide purifying means at the time the deterioration is detected.

30. The exhaust gas purifying apparatus according to claim 23, wherein the deterioration recovery time is set to be a time required for the reduction of substantially all the adsorbed SOx.

* * * * *